United States Patent
Sharma et al.

(10) Patent No.: US 10,547,694 B2
(45) Date of Patent: Jan. 28, 2020

(54) OUT-OF-BAND SERVICE DISCOVERY INDICATION

(71) Applicant: QUALCOMM Incorporated, San Diego, CA (US)

(72) Inventors: Manu Sharma, Sunnyvale, CA (US); Rajat Prakash, San Diego, CA (US); Miguel Griot, La Jolla, CA (US); Soumya Das, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 15/433,902

(22) Filed: Feb. 15, 2017

(65) Prior Publication Data

US 2017/0237817 A1 Aug. 17, 2017

Related U.S. Application Data

(60) Provisional application No. 62/296,060, filed on Feb. 16, 2016.

(51) Int. Cl.
| | |
|---|---|
| *H04L 12/50* | (2006.01) |
| *H04L 29/08* | (2006.01) |
| *H04W 16/16* | (2009.01) |
| *H04W 36/08* | (2009.01) |
| *H04W 48/10* | (2009.01) |
| *H04W 84/04* | (2009.01) |

(52) U.S. Cl.
CPC ............ *H04L 67/16* (2013.01); *H04L 67/02* (2013.01); *H04W 16/16* (2013.01); *H04W 36/08* (2013.01); *H04W 48/10* (2013.01); *H04W 84/042* (2013.01)

(58) Field of Classification Search
CPC ....................................................... H04J 12/50
USPC ............................................................ 370/360
See application file for complete search history.

(56) References Cited

U.S. PATENT DOCUMENTS

| | | | |
|---|---|---|---|
| 9,143,821 B2* | 9/2015 | Hayashi | H04N 21/4532 |
| 2007/0070935 A1 | 3/2007 | Prakash et al. | |
| 2013/0176897 A1 | 7/2013 | Wang et al. | |
| 2017/0201871 A1* | 7/2017 | Ryu | H04W 76/10 |

OTHER PUBLICATIONS

Hartung et al., "Policy Driven Multi-Band Spectrum Aggregation for Ultra-Broadband Wireless Networks," 2015 IEEE International Symposium on Dynamic Spectrum Access Networks (DYSPAN), Sep. 29, 2015, pp. 82-93, XP032822637, DOI: 10.1109/DYSPAN.2015.7343852, Institute of Electrical and Electronics Engineers.
ISA/EP, International Search Report and Written Opinion of the International Searching Authority, Int'l Application No. PCT/US2017/018164, May 16, 2017, European Patent Office, Rijswijk, NL, 16 pgs.

* cited by examiner

*Primary Examiner* — Dang T Ton
(74) *Attorney, Agent, or Firm* — Holland & Hart LLP

(57) ABSTRACT

Methods, systems, and devices for wireless communication are described. An access point (AP) may include a service discovery indicator in a broadcast message. A user equipment (UE) may tune to the radio frequency spectrum band of the AP and receive the broadcast message. The UE may identify a web resource based on the service discovery indicator and access the web resource to determine the capability configuration of the AP. The UE may access the web resource using an existing internet connection of its currently serving AP.

22 Claims, 16 Drawing Sheets

OUT-OF-BAND SERVICE DISCOVERY INDICATION

CROSS REFERENCES

The present Application for Patent claims priority to U.S. Provisional Patent Application No. 62/296,060 by Sharma, et al., entitled "Out-Of-Band Service Discovery Indication," filed Feb. 16, 2016, assigned to the assignee hereof.

BACKGROUND

The following relates generally to wireless communication, and more specifically to out-of-band service discovery indication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal FDMA (OFDMA) systems. A wireless multiple-access communications system may include a number of base stations and/or access points (APs), each simultaneously supporting communication for multiple communication devices, which may be otherwise known as a mobile device, a user equipment (UE), etc.

Different types of wireless communication systems may be deployed within a given coverage area. For example, a UE may be located within the coverage area of a long term evolution (LTE) or LTE-Advanced (LTE-A) wireless communication system, of a MulteFire wireless communication system, etc. For the UE to discover other wireless communication systems, the UE may tune away from its current base station or access point and tune to a different frequency for a brief period to scan and detect the presence of other systems. For example, the UE may detect the other wireless systems by receiving and decoding a master information block (MIB) and/or a system information block (SIB) broadcast from an access point (AP) of the other wireless system. While this information (e.g., the presence of the other wireless system) may be helpful, the UE may also need to determine the capabilities of the other system before determining whether to switch over to the other system for wireless communications. For certain UEs, e.g., UEs with a single tuner, the time it takes to determine the capabilities of the other wireless system may be extensive and this may lead to an interruption of wireless communications with its current serving base station or access point.

SUMMARY

The described techniques relate to improved methods, systems, devices, or apparatuses that support out-of-band service discovery indication. Generally, the described techniques provide for, in some aspects, a base station and/or AP (e.g., a non-serving AP) including an indication in a broadcast message that indicates that the base station and/or AP may support out-of-band (OOB) service discovery. The indication may be included as a bit, information element, field, etc., in an information block, such as a master information block (MIB) and/or a system information block (SIB). A UE may be connected to a serving AP that operates in a different radio frequency spectrum band. The UE may tune away from its serving AP and detect the presence of the non-serving AP. This detection may include decoding the MB/SIB and reading the OOB service discovery indicator. The UE may, based on the service discovery indicator, identify a web resource that is associated with a capability configuration of the non-serving AP. The UE may access the web resource to determine the capability configuration of the non-serving AP, e.g., the bandwidth, the throughput, the configuration information, the security protocols, etc. The UE may perform the detection and web resource access for each wireless communication system it detects in the area and then determine whether to switch from its current serving AP to one of the detected non-serving APs.

In other aspects, the non-serving AP may not include the service discovery indicator in its broadcast message. Instead, the UE may detect the non-serving AP by decoding and processing the MIB/SIB to determine the public land mobile network (PLMN) identifier associated with the non-serving AP, the cell identifier of the non-serving AP, etc. The UE may identify the web resource based on the information included in the broadcast message, e.g., a web resource associated with the PLMN, a web resource common to multiple PLMNs, etc. The UE may access the web resource to determine the capability configuration of the non-serving AP to determine whether to switch from its serving AP to the non-serving AP.

A method of wireless communication is described. The method may include receiving, via a first AP in a first radio frequency spectrum band, a broadcast message comprising a service discovery indicator, identifying, based at least in part on the service discovery indicator, a web resource associated with a capability configuration of the first AP and accessing, via a second AP in a second radio frequency spectrum band, the web resource to determine the capability configuration of the first AP in the first radio frequency spectrum band.

An apparatus for wireless communication is described. The apparatus may include means for receiving, via a first AP in a first radio frequency spectrum band, a broadcast message comprising a service discovery indicator, means for identifying, based at least in part on the service discovery indicator, a web resource associated with a capability configuration of the first AP and means for accessing, via a second AP in a second radio frequency spectrum band, the web resource to determine the capability configuration of the first AP in the first radio frequency spectrum band.

A further apparatus is described. The apparatus may include a processor, memory in electronic communication with the processor, and instructions stored in the memory. The instructions may be operable to cause the processor to receive, via a first AP in a first radio frequency spectrum band, a broadcast message comprising a service discovery indicator, identify, based at least in part on the service discovery indicator, a web resource associated with a capability configuration of the first AP and access, via a second AP in a second radio frequency spectrum band, the web resource to determine the capability configuration of the first AP in the first radio frequency spectrum band.

A non-transitory computer readable medium for wireless communication is described. The non-transitory computer-readable medium may include instructions to cause a processor to receive, via a first AP in a first radio frequency spectrum band, a broadcast message comprising a service discovery indicator, identify, based on the service discovery indicator, a web resource associated with a capability configuration of the first AP and access, via a second AP in a second radio frequency spectrum band, the web resource to determine the capability configuration of the first AP in the first radio frequency spectrum band.

Some examples of the method, apparatus, or non-transitory computer-readable medium described above may further include processes, features, means, or instructions for determining, based on the capability configuration of the first AP, to switch from the second AP to the first AP for wireless communications in the first radio frequency spectrum band.

In some examples of the method, apparatus, or non-transitory computer-readable medium described above, the service discovery indicator provides an indication that the first AP supports out-of-band service capability discovery. In some examples of the method, apparatus, or non-transitory computer-readable medium described above, receiving the broadcast message comprises: decoding an information block broadcast by the first AP in the first radio frequency spectrum band.

In some examples of the method, apparatus, or non-transitory computer-readable medium described above, the information block comprises at least one of a MIB or a SIB. In some examples of the method, apparatus, or non-transitory computer-readable medium described above, identifying the web resource comprises: computing an address of the web resource based on the service discovery indicator.

In some examples of the method, apparatus, or non-transitory computer-readable medium described above, the address comprises at least one of an internet protocol (IP) address, a fully qualified domain name (FQDN), or a uniform resource identifier (URI) of the web resource. In some examples of the method, apparatus, or non-transitory computer-readable medium described above, the first radio frequency spectrum band is an unlicensed radio frequency spectrum band associated with a MulteFire wireless network.

In some examples of the method, apparatus, or non-transitory computer-readable medium described above, the first radio frequency spectrum band is associated with a neutral host small cell wireless network. In some examples of the method, apparatus, or non-transitory computer-readable medium described above, the service discovery indicator comprises an address of the web resource.

A method of wireless communication is described. The method may include broadcasting, via a first AP in a first radio frequency spectrum band, a broadcast message comprising a service discovery indicator, the service discovery indicator providing an indication that the first AP supports out-of-band service capability discovery via a web resource and establishing communications with a wireless device based at least in part on the broadcast message.

An apparatus for wireless communication is described. The apparatus may include means for broadcasting, via an AP in a first radio frequency spectrum band, a broadcast message comprising a service discovery indicator, the service discovery indicator providing an indication that the first AP supports out-of-band service capability discovery via a web resource and means for establishing communications with a wireless device based at least in part on the broadcast message.

A further apparatus is described. The apparatus may include a processor, memory in electronic communication with the processor, and instructions stored in the memory. The instructions may be operable to cause the processor to broadcast, via a first AP in a first radio frequency spectrum band, a broadcast message comprising a service discovery indicator, the service discovery indicator providing an indication that the first AP supports out-of-band service capability discovery via a web resource and establish communications with a wireless device based at least in part on the broadcast message.

A non-transitory computer readable medium for wireless communication is described. The non-transitory computer-readable medium may include instructions to cause a processor to broadcast, via a first AP in a first radio frequency spectrum band, a broadcast message comprising a service discovery indicator, the service discovery indicator providing an indication that the first AP supports out-of-band service capability discovery via a web resource and establish communications with a wireless device based on the broadcast message.

In some examples of the method, apparatus, or non-transitory computer-readable medium described above, the broadcast message comprises an information block conveying the service discovery indicator. In some examples of the method, apparatus, or non-transitory computer-readable medium described above, the information block comprises at least one of a MIB or a SIB.

In some examples of the method, apparatus, or non-transitory computer-readable medium described above, the first radio frequency spectrum band is an unlicensed radio frequency spectrum band associated with a MulteFire wireless network. In some examples of the method, apparatus, or non-transitory computer-readable medium described above, the first radio frequency spectrum band is associated with a neutral host small cell wireless network. In some examples of the method, apparatus, or non-transitory computer-readable medium described above, the service discovery indicator comprises an address of the web resource.

A method of wireless communication is described. The method may include receiving, via a first AP in a first radio frequency spectrum band, a broadcast message, identifying, based at least in part on the broadcast message, a web resource associated with a capability configuration of the first AP and accessing, via a second AP in a second radio frequency spectrum band, the web resource to determine the capability configuration of the first AP in the first radio frequency spectrum band.

An apparatus for wireless communication is described. The apparatus may include means for receiving, via a first AP in a first radio frequency spectrum band, a broadcast message, means for identifying, based at least in part on the broadcast message, a web resource associated with a capability configuration of the first AP and means for accessing, via a second AP in a second radio frequency spectrum band, the web resource to determine the capability configuration of the first AP in the first radio frequency spectrum band.

A further apparatus is described. The apparatus may include a processor, memory in electronic communication with the processor, and instructions stored in the memory. The instructions may be operable to cause the processor to receive, via a first AP in a first radio frequency spectrum band, a broadcast message, identify, based at least in part on the broadcast message, a web resource associated with a capability configuration of the first AP and access, via a second AP in a second radio frequency spectrum band, the web resource to determine the capability configuration of the first AP in the first radio frequency spectrum band.

A non-transitory computer readable medium for wireless communication is described. The non-transitory computer-readable medium may include instructions to cause a processor to receive, via a first AP in a first radio frequency spectrum band, a broadcast message, identify, based on the broadcast message, a web resource associated with a capability configuration of the first AP and access, via a second AP in a second radio frequency spectrum band, the web resource to determine the capability configuration of the first AP in the first radio frequency spectrum band.

Some examples of the method, apparatus, or non-transitory computer-readable medium described above may further include processes, features, means, or instructions for determining, based on the capability configuration of the first AP, to switch from the second AP to the first AP for wireless communications in the first radio frequency spectrum band.

In some examples of the method, apparatus, or non-transitory computer-readable medium described above, receiving the broadcast message comprises: decoding an information block broadcast by the first AP in the first radio frequency spectrum band. In some examples of the method, apparatus, or non-transitory computer-readable medium described above, the information block comprises at least one of a MIB or a SIB. In some examples of the method, apparatus, or non-transitory computer-readable medium described above, identifying the web resource comprises: computing an address of the web resource based on an identifier of the first AP included in the broadcast message.

DETAILED DESCRIPTION

Figure 1:
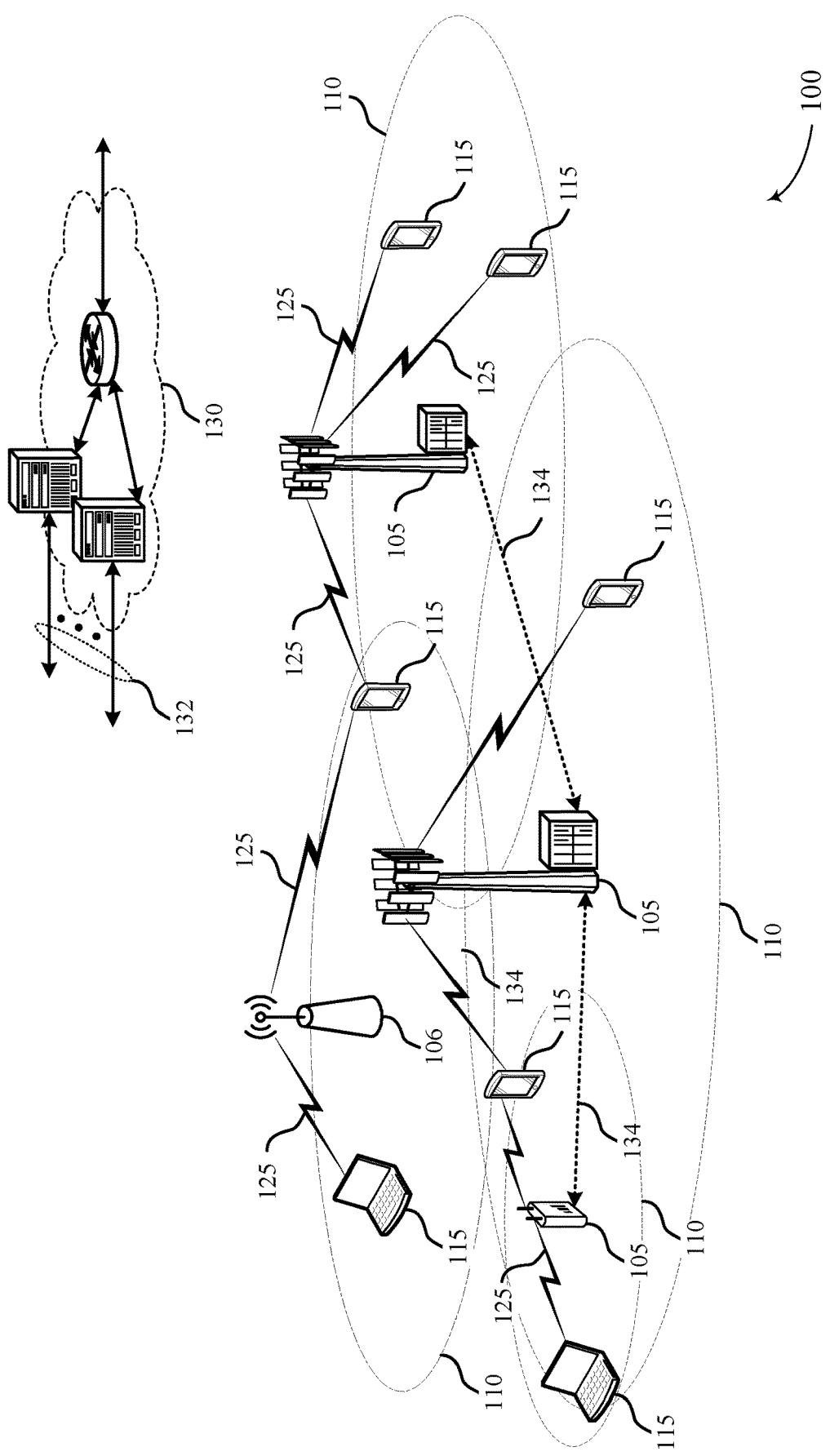
FIG. 1 illustrates an example of a wireless communications system that supports out-of-band service discovery indication in accordance with aspects of the present disclosure.

A user equipment (UE) typically connects to a serving access point (AP) for wireless communications. The serving AP may operate in a particular radio frequency spectrum band for wireless communications with the UE. The UE may perform a tune away procedure to a different radio frequency spectrum band to determine if other wireless communication systems are operating in the area, e.g., non-serving APs or OOB APs. For a UE with a single tuner, the time that the UE is tuned away to detect the OOB APs may interrupt communications with its serving AP. While the time associated with detecting non-serving APs may be relatively brief, the time and overhead associated with determining the capability configuration of the non-serving APs may be more extensive. This may result in increased opportunities for missed communications with its serving AP. It may be helpful for a UE to be able to detect the presence of OOB/non-serving APs and then determine the capability configuration of the non-serving APs using its existing connection with the serving AP.

Aspects of the disclosure are initially described in the context of a wireless communication system. In some aspects, the described techniques provide for an improved method, system, device, apparatus, or methods for wireless communications that support OOB service discovery. In some aspects, an AP may include a service discovery indicator in a broadcast message. The service discovery indicator may indicate that the AP supports OOB service capability discovery via a web resource. For example, the web resource may store and provide information identifying the capability configuration of the AP. A UE may be connected to a serving AP and perform a tune-away procedure to determine if other APs are operating in the area. The UE may tune to a different radio frequency spectrum band (e.g., OOB) and detect a non-serving/OOB AP. The UE may receive from the non-serving AP a broadcast message that includes a service discovery indicator. The service discovery indicator may provide an indication that the non-serving AP supports OOB service capability discovery using a web resource. The UE may identify the web resource based on the service discovery indicator. The web resource may be associated with a capability configuration of the non-serving AP. In some cases, the UE may tune back to its serving AP and access the web resource using the existing connection to the serving AP. The UE may determine the capability configuration of the non-serving AP. Thus, the UE may detect the non-serving AP in the OOB radio frequency spectrum band and then use its existing connection to the serving AP in the in-band radio frequency spectrum band to determine the capability configuration of the non-serving AP.

In other aspects, the non-serving AP may not include a service discovery indicator in its broadcast message. Instead, the UE may tune away to detect the non-serving AP in the OOB radio frequency spectrum band. Detecting may include receiving a broadcast message from the non-serving AP. The broadcast message may include an information block conveying an identification of the PLMN of the non-serving AP, a cell identifier of the non-serving AP, and the like. The UE may identify the web resource based on the broadcast message, e.g., a web resource associated with the PLMN. The UE may access the web resource and determine the capability configuration of the non-serving AP. The UE may access the web resource using an existing connection to the serving AP on the in-band radio frequency spectrum band. Various aspects of the disclosure are further illustrated by and described with reference to apparatus diagrams, system diagrams, and flowcharts that relate to out-of-band service discovery indication.

FIG. 1 illustrates an example of a wireless communications system 100 in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-Advanced (LTE-A) network. In other aspects, wireless communications system 100 may be a heterogeneous system including different wireless networks. For example, wireless communications system 100 may include an LTE/LTE-A network, a MulteFire network, a neutral host small cell network, etc., operating with overlapping coverage areas. A MulteFire network may include access points (APs) and/or base stations 105 communicating in an unlicensed radio frequency spectrum band, e.g., without an licensed anchor carrier. For example, the MulteFire network may operate without an anchor carrier in the licensed spectrum.

Base stations 105 may wirelessly communicate with UEs 115 via one or more base station antennas. Each base station 105 may provide communication coverage for a respective geographic coverage area 110. Different wireless networks may have coverage areas 110 of different sizes. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105. Base stations 105 may also be referred to as an AP, such as an AP 106.

Wireless communications system 100 may include components of, be co-located with, or operate on shared spectrum with a wireless local area network (WLAN). A WLAN may support communications with one or more UEs 115 (which may also be known as a station (STA). Although not shown in FIG. 1, a UE 115 may be located in the intersection of more than one coverage area 110 and may associate with more than one AP 106. A single AP 106 and an associated set of UEs 115 may be referred to as a BSS. An ESS is a set of connected BSSs. A distribution system (not shown) may be used to connect APs in an ESS. In some cases, the coverage area 110 of an AP 106 may be divided into sectors (also not shown). A WLAN network may include APs 106 of different types (e.g., metropolitan area, home network, etc.), with varying and overlapping coverage areas 110. Two UEs 115 may also communicate directly via a direct wireless link 125 regardless of whether both UEs 115 are in the same coverage area 110. Examples of direct wireless links 120 may include Wi-Fi Direct connections, Wi-Fi Tunneled Direct Link Setup (TDLS) links, and other group connections. UEs 115 and APs 106 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, etc. In other implementations, peer-to-peer connections or ad hoc networks may be implemented within.

After completing initial cell synchronization, a UE 115 may decode the master information block (MIB), system information block 1 (SIB1) and SIB2 prior to accessing the network. The MIB may be transmitted on physical broadcast channel (PBCH) and may utilize the first four orthogonal frequency division multiple access (OFDMA) symbols of the second slot of the first subframe of each radio frame. It may use the middle six resource block (RB)s (72 subcarriers) in the frequency domain. The MIB carries a few important pieces of information for UE initial access, including: DL channel bandwidth in term of RBs, physical HARQ indicator channel (PHICH) configuration (duration and resource assignment), and system frame number (SFN). A new MIB may be broadcast every fourth radio frame (SFN mod 4=0) at and rebroadcast every frame (10 ms). Each repetition may be scrambled with a different scrambling code. After reading a MIB (either a new version or a copy), the UE 115 may try different phases of a scrambling code until it gets a successful cyclic redundancy check (CRC) check. The phase of the scrambling code (0, 1, 2 or 3) may enable the UE 115 to identify which of the four repetitions has been received.

Thus, the UE 115 may determine the current SFN by reading the SFN in the decoded transmission and adding the scrambling code phase. After receiving the MIB, a UE may receive one or more SIBs. Different SIBs may be defined according to the type of system information (SI) conveyed. A new SIB1 may be transmitted in the fifth subframe of every eighth frame (SFN mod 8=0) and rebroadcast every other frame (20 ms). SIB1 includes access information, including cell identity (CID) information, and it may indicate whether a UE is allowed to camp on a cell 105. SIB1 also includes cell selection information (or cell selection parameters). SIB1 may include, in certain aspects, an identifier of the PLMN associated with the AP 106 and/or base station 105. Additionally, SIB1 includes scheduling information for other SIBs. SIB2 may be scheduled dynamically according to information in SIB1, and includes access information and parameters related to common and shared channels. The periodicity of SIB2 can be set to 8, 16, 32, 64, 128, 256 or 512 radio frames.

In some cases, wireless communications system 100 may utilize one or more enhanced component carriers (eCCs). An eCC may be characterized by one or more features including: flexible bandwidth, different transmission time intervals (TTIs), and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum). An eCC characterized by flexible bandwidth may include one or more segments that may be utilized by UEs 115 that are not capable of monitoring the whole bandwidth or prefer to use a limited bandwidth (e.g., to conserve power).

In some cases, an eCC may utilize a different TTI length than other CCs, which may include use of a reduced or variable symbol duration as compared with TTIs of the other CCs. The symbol duration may remain the same, in some cases, but each symbol may represent a distinct TTI. In some examples, an eCC may support transmissions using different TTI lengths. For example, some CCs may use uniform 1 ms TTIs, whereas an eCC may use a TTI length of a single symbol, a pair of symbols, or a slot. In some cases, a shorter symbol duration may also be associated with increased subcarrier spacing. In conjunction with the reduced TTI length, an eCC may utilize dynamic time division duplex (TDD) operation (i.e., it may switch from DL to UL operation for short bursts according to dynamic conditions.)

Flexible bandwidth and variable TTIs may be associated with a modified control channel configuration (e.g., an eCC may utilize an ePDCCH for DL control information). For example, one or more control channels of an eCC may utilize frequency-division multiplexing (FDM) scheduling to accommodate flexible bandwidth use. Other control channel modifications include the use of additional control channels (e.g., for eMBMS scheduling, or to indicate the length of variable length UL and DL bursts), or control channels transmitted at different intervals. An eCC may also include modified or additional HARQ related control information.

In some aspects, a base station 105 and/or an AP 106 may include a service discovery indicator in a broadcast message. The broadcast message may be a MIB, SIB1, SIB2, etc. The service discovery indicator may convey an indication that the base station 105/AP 106 supports OOB service capability discovery. The OOB service capability discovery may be supported by a web resource, e.g., remote server, webpage, access port, etc., that stores and provides information associated with the capability configuration of the broadcasting base station 105/AP 106. A UE 115 may be connected to a serving base station 105 or an AP 106 (e.g., a MulteFire AP) communicating over a first radio frequency spectrum band (e.g., in-band communications). The UE 115 may tune away from the serving base station 105/AP 106 (AP 106 for ease of reference) to a different radio frequency spectrum band (e.g., OOB) to detect the presence of other wireless networks. The UE 115 may detect a non-serving AP 106 and receive the broadcast message. The broadcast message may include the service discovery indicator that the UE 115 uses to identify the web resource associated with the capability configuration of the non-serving AP 106. The UE 115 may access the web resource using the existing connection with the serving AP 106 over the in-band radio frequency spectrum band. The UE 115 may determine the capability configuration of the non-serving AP 106 in the OOB radio frequency spectrum band by accessing the web resource.

In some examples, the base station 105 and/or AP 106 may not include the service discovery indicator in the broadcast message. Instead, the base station 105 and/or AP 106 may send the broadcast message, e.g., the MIB, SIB1, SIB2, etc. The UE 115 may tune away from the serving base station 105/AP 106 to a different radio frequency spectrum band (e.g., OOB) to detect the presence of other wireless networks. The UE 115 may detect a non-serving AP 106 and receive the broadcast message. The broadcast message may include various identifying information associated with the non-serving AP 106 that the UE 115 uses to identify the web resource associated with the capability configuration of the non-serving AP 106. The UE 115 may access the web resource using the existing connection with the serving AP 106 over the in-band radio frequency spectrum band. The UE 115 may determine the capability configuration of the non-serving AP 106 in the OOB radio frequency spectrum band by accessing the web resource. Thus, the described techniques provide for the UE 115 to perform OOB detection of the non-serving base station 105 and/or AP 106 and then leverage the existing in-band connection to its serving base station 105 or AP 106 to determine the capability configuration of the non-serving base station 105 and/or AP 106.

Figure 2:
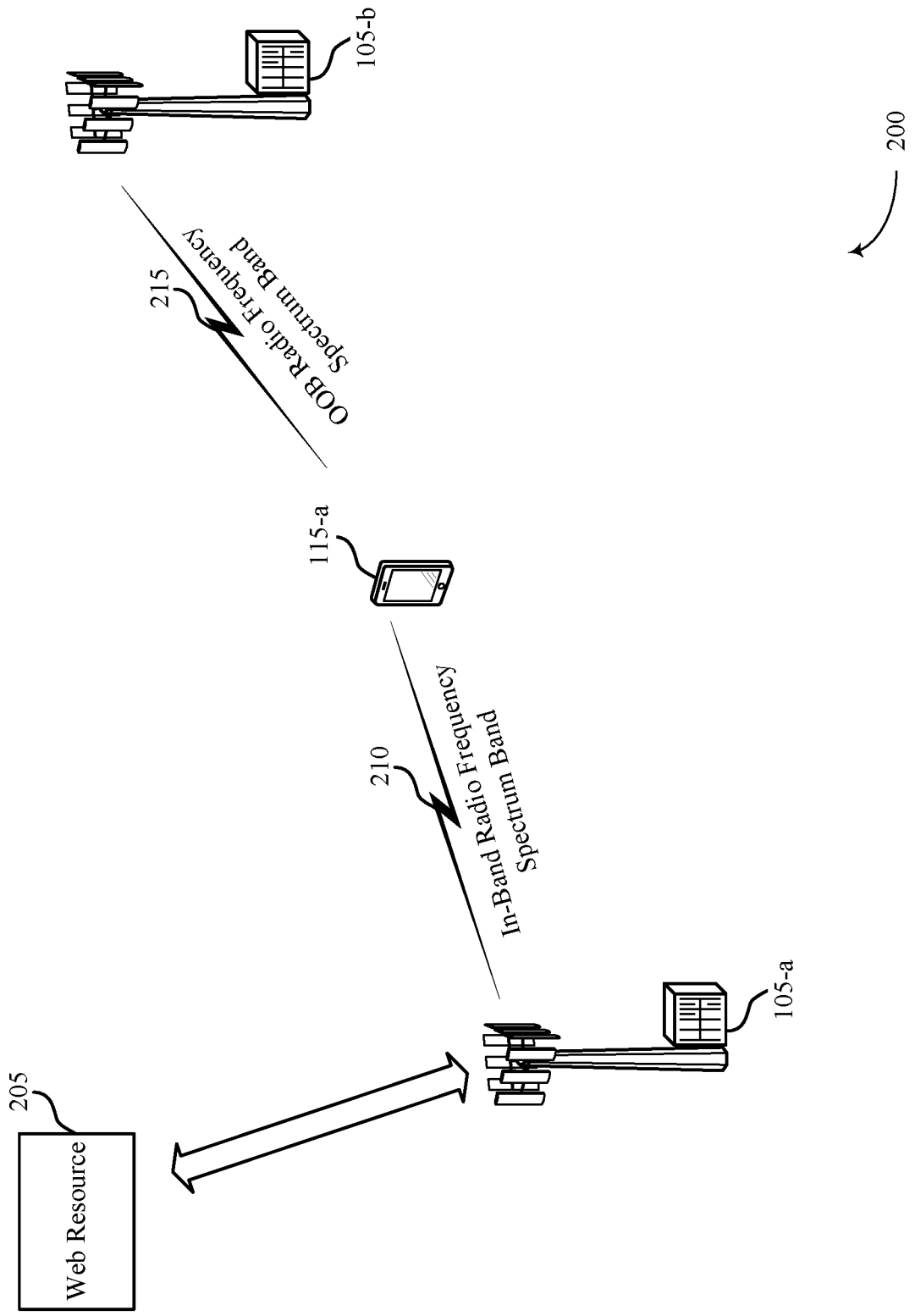
FIG. 2 illustrates an example of a wireless communications system that supports out-of-band service discovery indication in accordance with aspects of the present disclosure.

FIG. 2 illustrates an example of a wireless communications system 200 for OOB service discovery operations. Wireless communications system 200 may include base station 105-a, base station 105-b, and UE 115-a, which may be examples of the corresponding devices described with reference to FIG. 1. Wireless communications system 200 may include a web resource 205, which may be an example of a remote server, a webpage, or the like. The web resource 205 may be accessible by base station 105-a and/or base station 105-b via a core network, such as core network 130 described with reference to FIG. 1. In some examples, web resource 205 may be a component of a core network, such as core network 130. It is to be understood that one or both of base stations 105-a and/or 105-b may be an AP, such as AP 106 described with reference to FIG. 1.

In some cases, UE 115-a may be connected to the base station 105-a and may perform wireless communications using an in-band radio frequency spectrum band 210. That is, the base station 105-a may be a serving base station for UE 115-a. The UE 115-a and the base station 105-a may perform wireless communications using the in-band radio frequency spectrum band 210. The wireless communications may include an existing connection (e.g., time/frequency resources) allocated between the UE 115-a and the base station 105-a. The UE 115-a may access various resources via the connection with the base station 105-a, such as web resource 205 and/or other internet services.

In some other cases, UE 115-a may be connected to the base station 105-b and may perform wireless communications using an OOB radio frequency spectrum band 215. The base station 105-b may be a non-serving base station from the perspective of the UE 115-a. Base stations 105-a and 105-b may be associated with a different type of wireless network, such as a MulteFire wireless network, a neutral host small cell wireless network, etc. In some examples, the base station 105-a may be a LTE/LTE-A base station and base station 105-b may be a MulteFire AP. In another example, base stations 105-a and 105-b may be associated with the same type of wireless network, but operating in different radio frequency spectrum bands, e.g., base stations 105-a and 105-b may both be MulteFire APs. Moreover, base station 105-a and base station 105-b may have different capability configurations. That is, each of base station 105-a and 105-b may have an associated capability configuration including, for example, throughput capacity, load levels, connection configurations, security protocols, etc. Web resource 205 may store the capability configuration for base stations 105-a and/or 105-b.

UE 115-a may detect the presence of base station 105-b by performing a tune-away procedure from the in-band radio frequency spectrum band 210 of base station 105-a to the OOB radio frequency spectrum band 215 of base station 105-b. The UE 115-a may perform the tune-away procedure periodically, aperiodically, or on an as-needed basis. In some examples, the UE 115-a perform the tune-away procedure based on its connection with serving base station 105-a degrading below a threshold level. Detecting the presence of base station 105-b may include receiving and decoding a broadcast message from base station 105-b. The broadcast message may include an information block, such as MIB, SIB1, SIB2, etc. In some examples, the broadcast message may include a service discovery indicator, e.g., a bit, field, information element, etc., that conveys an indication that the base station 105-b supports OOB service capability discovery operations. In other examples, the broadcast message may not include the service discovery indicator. The information block conveys identification information associated with the base station 105-b, e.g., a PLMN ID, cell ID, etc.

While the broadcast message may provide sufficient information to detect the presence of base station 105-b, the UE 115-a may not have sufficient information to determine the capability configuration of base station 105-b. Therefore, the UE 115-a may identify web resource 205 based on the broadcast message. Identifying web resource 205 may be based on the service discovery indicator, when included in the broadcast message. For example, UE 115-a may identify the web resource 205 by computing an address of web resource 205, e.g., an internet protocol (IP) address, a fully qualified domain name (FQDN) of web resource 205, a uniform resource identifier (URI), and the like. In some examples, the service discovery indicator may include the address of web resource 205. In some aspects, UE 115-a may compute the address of web resource 205 based on additional factors, such as the identification information conveyed in the MIB/SIB1, e.g., PLMN ID, AP ID, Cell ID, E-UTRAN Cell ID (ECGI), etc.

In some examples, the service discovery indicator may not be included in the broadcast message. Identifying web resource 205 may be based on the information block included in the broadcast message, e.g., the information included in the MIB, SIB1, etc. For example, the UE 115-a may identify the web resource 205 based on calculating an address of the web resource 205 using the identification information of base station 105-b. The UE 115-a may know, for example, a fixed set of addresses of web resources associated with different PLMNs, associated with different types of wireless networks, etc.

Once the UE 115-a has identified the web resource 205, UE 115-a may access the web resource 205 using its existing connection to base station 105-a over the in-band radio frequency spectrum band, e.g., UE 115-a may tune back to the in-band radio frequency spectrum band of base station 105-a. The UE 115-a may access web resource 205 to determine the capability configuration of base station 105-b in the OOB radio frequency spectrum band. For example, UE 115-a may send a query to web resource via the established internet connection with base station 105-a. The query may utilize an application protocol like hypertext transfer protocol (HTTP) or HTTP secure (HTTPS) and may use a transport protocol such as transmission control protocol (TCP) or user datagram protocol (UDP), for example. The query may include the identification information included in the broadcast message.

The capability configuration for base station 105-b may include various operational and/or connection parameters associated with wireless communications via the OOB radio frequency spectrum band on the base station 105-b. UE 115-a may use the capability configuration of base station 105-b to determine whether to switch from base station 105-a to base station 105-b for wireless communications, e.g., base station 105-b may provide a more robust connection, a more secure connection, a faster connection, etc., than base station 105-a. Thus, UE 115-a may utilize its existing internet connection with base station 105-a to determine the capability configuration for OOB base stations. This may reduce the time the UE 115-a is tuned away from base station 105-a for discovery operations.

Although not shown in FIG. 2, it is to be understood that UE 115-a may utilize the described techniques for additional OOB base stations to determine whether to switch serving base stations. For example, the UE 115-a may perform the described techniques for each of several detected OOB base stations and determine whether to switch to one of the detected OOB base stations for wireless communications.

Additionally, it is to be understood that examples of a different radio frequency spectrum band (e.g., in-band and OOB) may include base stations operating in different frequency bands (e.g., 2.4 GHz and 5 GHz). Another example may include base stations operating within a particular group of frequencies (e.g., separate channels) within a range of frequencies of a frequency band. Another example may include base stations operating (e.g., co-existing) on the same frequency, but using different configurations for wireless communications such that the UE 115-a reconfigures its tuner (e.g., to a different encoding scheme, to a different timing synchronization, etc.) to detect the presence of other wireless networks operating on the channel.

Figure 3:
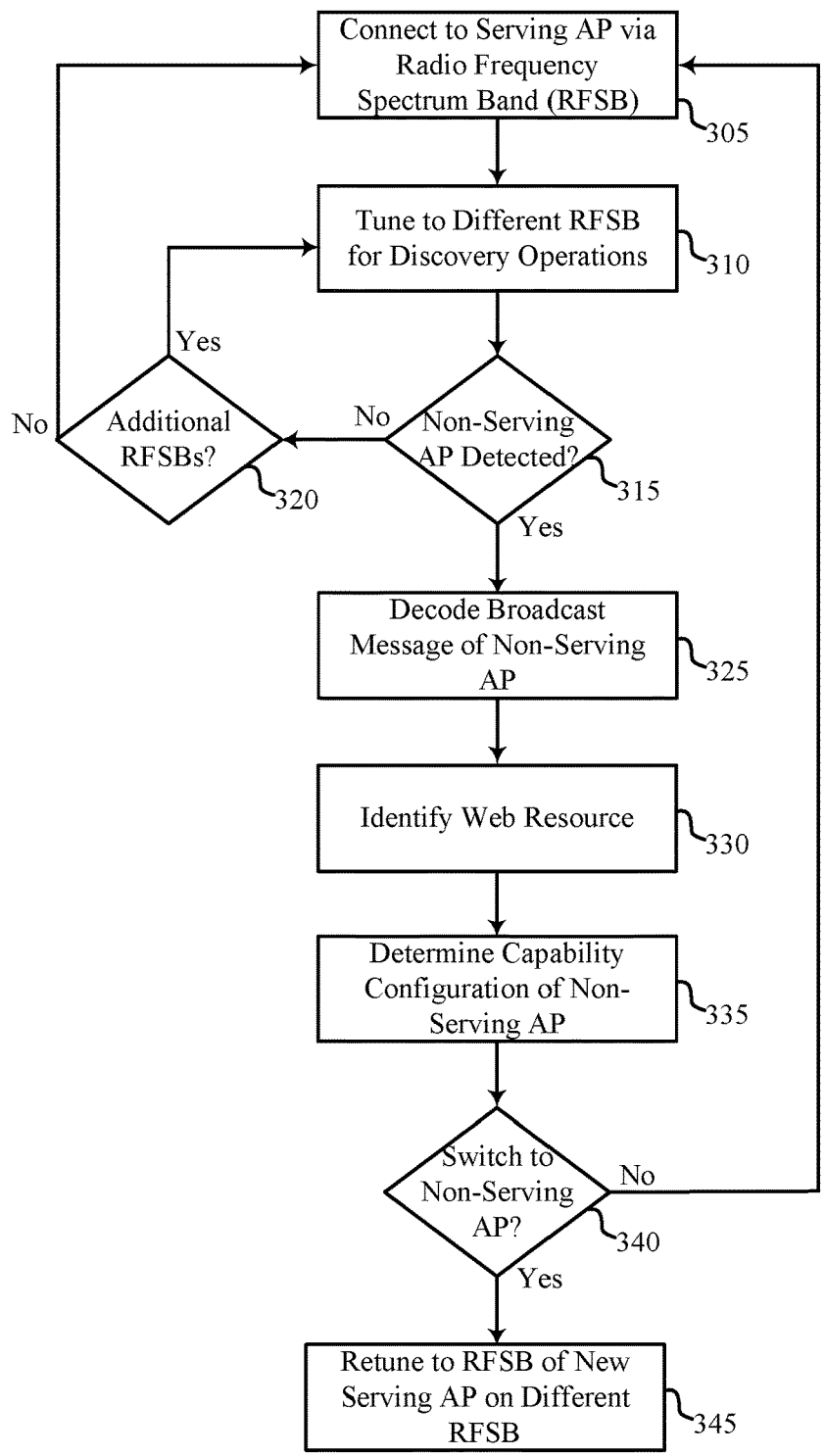
FIG. 3 illustrates an example of a process flow in a system that supports out-of-band service discovery indication in accordance with aspects of the present disclosure.

FIG. 3 illustrates an example of a process flow 300 for out-of-band service discovery operations in accordance with various aspects of the present disclosure. Aspects of process flow 300 may performed by a base station 105, AP 106, and a UE 115, which may be examples of the corresponding devices described with reference to FIG. 1-2. For ease of explanation, process flow 300 will be described with respect to a UE 115 and an AP 106. However, it is to be understood that the AP 106 (the serving AP and/or the non-serving AP) may be implemented as a base station.

At block 305, a UE 115 may be connected to a serving AP 106 and performing wireless communications via a radio frequency spectrum band, e.g., in-band communications between the UE 115 and the AP 106. UE 115 may have an existing connection with the serving AP 106 with assigned resources, e.g., an active internet connection. At block 310, UE 115 may tune to a different radio frequency spectrum band, e.g., an OOB radio frequency spectrum band, for discovery operations. UE 115 may perform discovery operations due to the connection to its serving AP 106 degrading below a threshold level, for example. UE 115 may perform discovery operations according to a schedule, in other examples.

At block 315, UE 115 may determine whether a non-serving AP 106 has been detected. Detecting the non-serving AP may include receiving a broadcast message from the non-serving AP 106. The broadcast message may include an information block, e.g., a MIB, a SIB1, etc. In some examples, the information block may include a service discovery indicator that conveys an indication that the non-serving AP 106 supports OOB service capability discovery. In other examples, the information block does not include the service discovery indicator.

If no non-serving AP 106 is detected, at block 320 the UE 115 determines if there are additional radio frequency spectrum bands available to perform detection operations. If there are no additional radio frequency spectrum bands to perform discovery operations, the UE 115 returns to block 305 to perform in-band wireless communications with the serving AP 106. If there are additional radio frequency spectrum bands to perform discovery operations, the UE 115 returns to block 310 to tune to the additional radio frequency spectrum bands for discovery operations.

Returning to block 315, when a non-serving AP 106 is detected in the OOB radio frequency spectrum band, at block 325 the UE 115 decodes the broadcast message from the non-serving AP 106. Decoding the broadcast message may include reading the information block, e.g., MIB, SIB1, SIB2, etc. Decoding the broadcast message may include reading the service discovery indicator, if included in the broadcast message. The information block may convey identification information associated with the detected non-serving AP 106, e.g., PLMN ID, Cell ID, etc.

At block 330, UE 115 may identify the web resource based on the broadcast message. Identifying the web resource may include calculating or otherwise computing an address of the web resource. The address may be calculated based on the broadcast message, the information block, the identification information of the non-serving AP 106, etc.

When included in the broadcast message, the address may be calculated based on the service discovery indicator. The address may be a URL, FQDN, IP address, etc. identifying the web resource.

At block 335, the UE 115 may access the web resource to determine the capability configuration of the detected non-serving AP 106. The UE 115 may retune to the in-band radio frequency spectrum band and use the existing internet connection of its current serving AP 106 to access the web resource. The UE 115 may send a query to the web resource that identifies the detected OOB non-serving AP 106 and requests various operational/connection configuration information associated with the non-serving AP 106. The web resource may respond by sending the requested capability configuration information of the non-serving AP 106 to UE 115.

At block 340, UE 115 may determine whether to switch to the non-serving AP 106 for wireless communications. For example, the UE 115 may compare the capability configuration of the non-serving AP 106 with its current serving AP and determine which AP 106 would provide suitable communications for the UE 115. It is to be understood that the UE 115 may also consider its requirements when determining whether to switch to the non-serving AP 106, e.g., the amount of data to transmit, the priority level of data communications, the latency requirement for data communications, the security requirement for data communications, etc. Thus, the UE 115 may determine whether to switch from its serving AP 106 to the non-serving AP 106 based on the capability configuration of the non-serving AP 106, based on the capability configuration of its serving AP 106, based on the requirements of the UE 115, or combinations of these considerations.

If the UE 115 decides not to switch to the non-serving AP 106, process 300 returns to block 305 to continue wireless communications with its serving AP 106. If the UE 115 decides to switch to the non-serving AP 106, at block 345 the UE retunes to the radio frequency spectrum band of the non-serving AP 106 (which would now be considered its new serving AP 106) and connects to the new serving AP 106.

Figure 4:
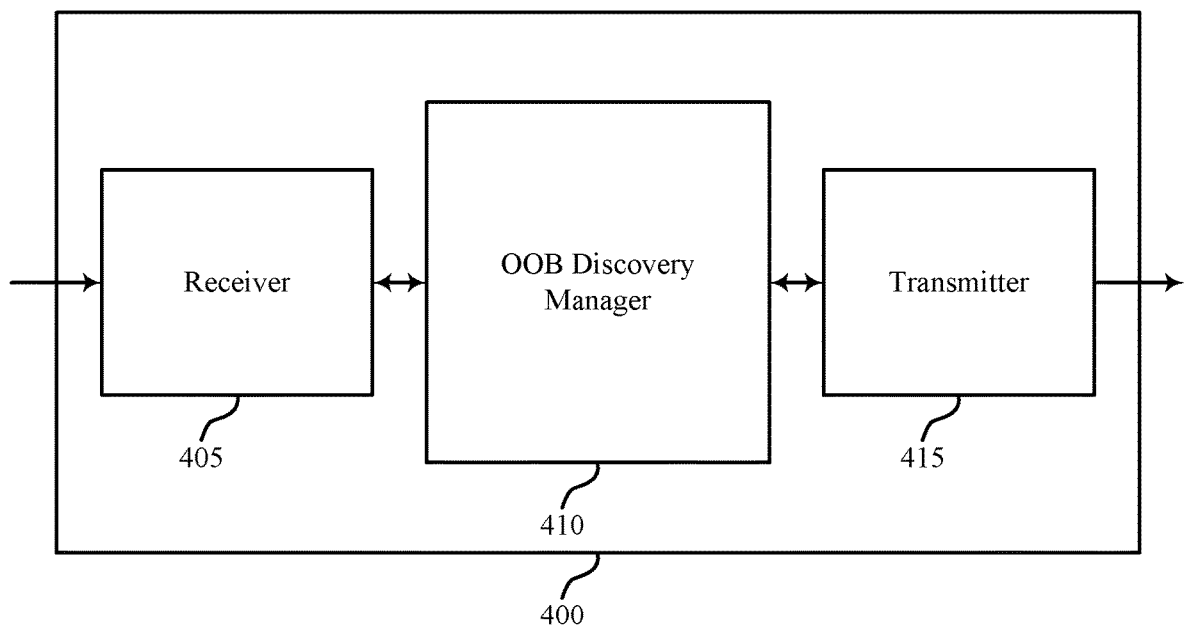
FIGS. 4 through 6 show block diagrams of a wireless device that supports out-of-band service discovery indication in accordance with aspects of the present disclosure.

FIG. 4 shows a block diagram of a wireless device 400 that supports out-of-band service discovery operations in accordance with various aspects of the present disclosure. Wireless device 400 may be an example of aspects of a UE 115 described with reference to FIGS. 1 through 3. Wireless device 400 may include receiver 405, OOB discovery manager 410 and transmitter 415. Wireless device 400 may also include a processor. Each of these components may be in communication with each other.

The receiver 405 may receive information such as packets, user data, or control information associated with various information channels (e.g., control channels, data channels, and information related to out-of-band service discovery indication, etc.). Information may be passed on to other components of the device. The receiver 405 may be an example of aspects of the transceiver 725 described with reference to FIG. 7.

The OOB discovery manager 410 may receive, via a first AP in a first radio frequency spectrum band (e.g., a non-serving AP), a broadcast message, identify, based on the broadcast message, a web resource associated with a capability configuration of the first AP, and access, via a second AP in a second radio frequency spectrum band (e.g., a serving AP), the web resource to determine the capability configuration of the first AP in the first radio frequency spectrum band.

The OOB discovery manager 410 may also receive, via a first AP in a first radio frequency spectrum band, a broadcast message including a service discovery indicator, identify, based on the service discovery indicator, a web resource associated with a capability configuration of the first AP, and access, via a second AP in a second radio frequency spectrum band, the web resource to determine the capability configuration of the first AP in the first radio frequency spectrum band. The OOB discovery manager 410 may also be an example of aspects of the OOB discovery manager 705 described with reference to FIG. 7.

The transmitter 415 may transmit signals received from other components of wireless device 400. In some examples, the transmitter 415 may be collocated with a receiver in a transceiver module. For example, the transmitter 415 may be an example of aspects of the transceiver 725 described with reference to FIG. 7. The transmitter 415 may include a single antenna, or it may include a plurality of antennas.

Figure 5:
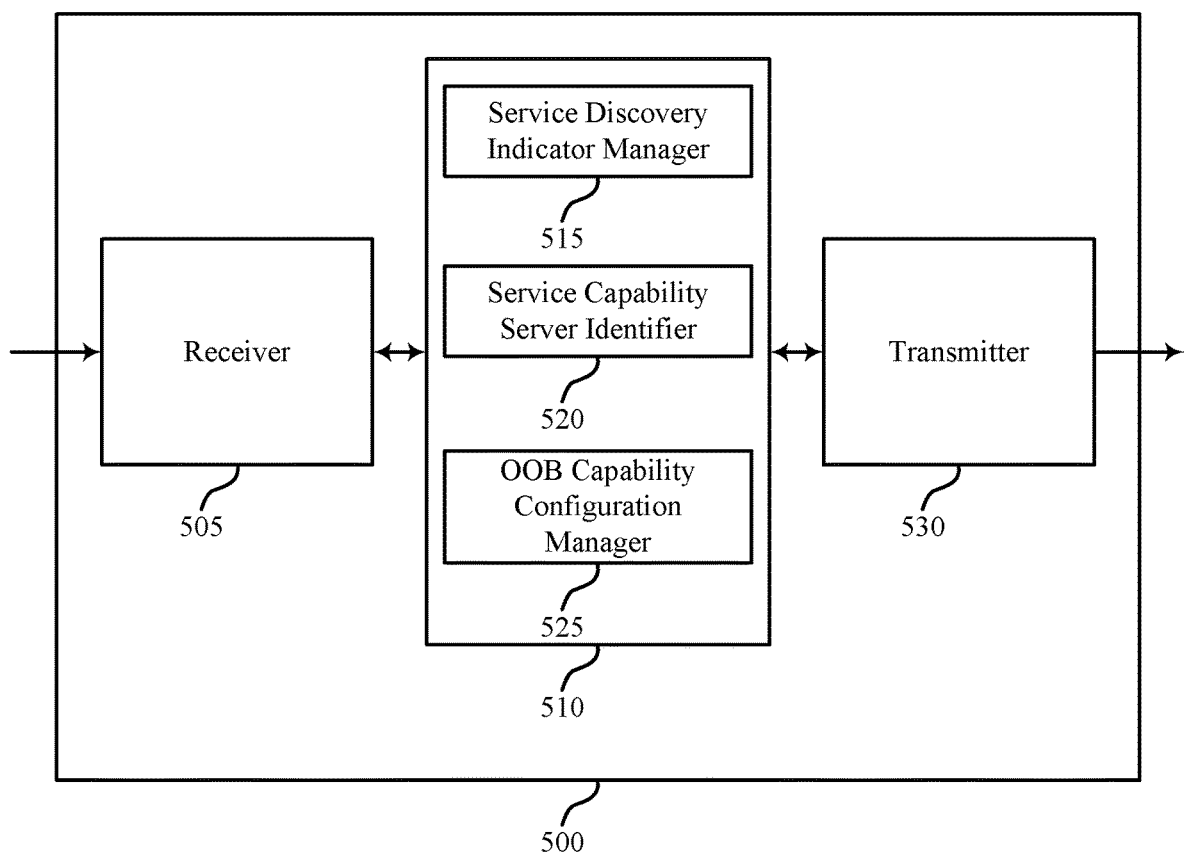

FIG. 5 shows a block diagram of a wireless device 500 that supports out-of-band service discovery indication in accordance with various aspects of the present disclosure. Wireless device 500 may be an example of aspects of a wireless device 400 or a UE 115 described with reference to FIGS. 1 through 4. Wireless device 500 may include receiver 505, OOB discovery manager 510 and transmitter 530. Wireless device 500 may also include a processor. Each of these components may be in communication with each other.

The receiver 505 may receive information which may be passed on to other components of the device. The receiver 505 may also perform the functions described with reference to the receiver 405 of FIG. 4. The receiver 505 may be an example of aspects of the transceiver 725 described with reference to FIG. 7.

The OOB discovery manager 510 may be an example of aspects of OOB discovery manager 410 described with reference to FIG. 4. The OOB discovery manager 510 may include service discovery indicator manager 515, service capability server identifier 520 and OOB capability configuration manager 525. The OOB discovery manager 510 may be an example of aspects of the OOB discovery manager 705 described with reference to FIG. 7.

The service discovery indicator manager 515 may receive, via a first AP in a first radio frequency spectrum band, a broadcast message which may include a service discovery indicator. In some cases, the service discovery indicator provides an indication that the first AP supports out-of-band service capability discovery.

In some cases, the first radio frequency spectrum band is an unlicensed radio frequency spectrum band associated with a MulteFire wireless network. In some cases, the first radio frequency spectrum band is associated with a neutral host small cell wireless network. In some cases, the service discovery indicator includes an address of the web resource.

The service capability server identifier 520 may identify, based on the broadcast message, a web resource associated with a capability configuration of the first AP, and identify, based on the service discovery indicator, a web resource associated with a capability configuration of the first AP.

The OOB capability configuration manager 525 may access, via a second AP in a second radio frequency spectrum band, the web resource to determine the capability configuration of the first AP in the first radio frequency spectrum band, and access, via a second AP in a second radio frequency spectrum band, the web resource to determine the capability configuration of the first AP in the first radio frequency spectrum band.

The transmitter 530 may transmit signals received from other components of wireless device 500. In some examples, the transmitter 530 may be collocated with a receiver in a transceiver module. For example, the transmitter 530 may be an example of aspects of the transceiver 725 described with reference to FIG. 7. The transmitter 530 may utilize a single antenna, or it may utilize a plurality of antennas.

Figure 6:
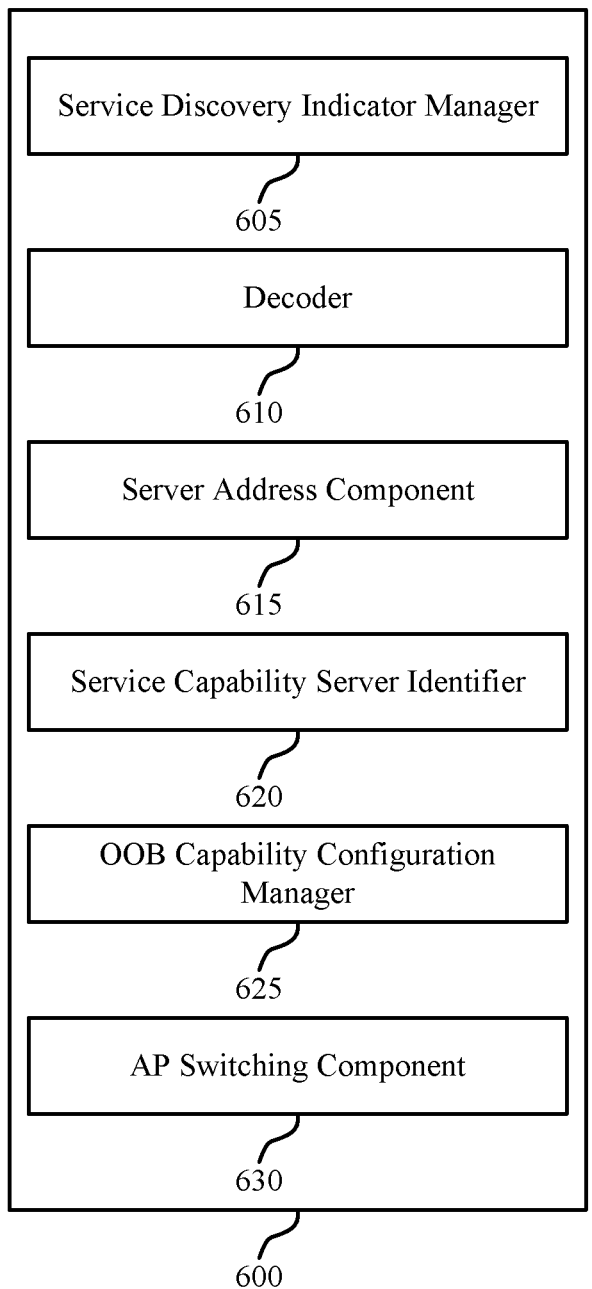

FIG. 6 shows a block diagram of a OOB discovery manager 600 which may be an example of the corresponding component of wireless device 400 or wireless device 500. That is, OOB discovery manager 600 may be an example of aspects of OOB discovery manager 410 or OOB discovery manager 510 described with reference to FIGS. 4 and 5. The OOB discovery manager 600 may also be an example of aspects of the OOB discovery manager 705 described with reference to FIG. 7.

The OOB discovery manager 600 may include service discovery indicator manager 605, decoder 610, server address component 615, service capability server identifier 620, OOB capability configuration manager 625 and AP switching component 630. Each of these modules may communicate, directly or indirectly, with one another (e.g., via one or more buses).

The service discovery indicator manager 605 may receive, via a first AP in a first radio frequency spectrum band, a broadcast message, and/or receive, via a first AP in a first radio frequency spectrum band, a broadcast message including a service discovery indicator. In some cases, the service discovery indicator provides an indication that the first AP supports out-of-band service capability discovery. In some cases, the first radio frequency spectrum band is an unlicensed radio frequency spectrum band associated with a MulteFire wireless network. In some cases, the first radio frequency spectrum band is associated with a neutral host small cell wireless network. In some cases, the service discovery indicator includes an address of the web resource.

The decoder 610 may decode an information block broadcast by the first AP in the first radio frequency spectrum band. In some cases, the information block includes at least one of a MIB or a SIB. In some cases, receiving the broadcast message includes: decoding an information block broadcast by the first AP in the first radio frequency spectrum band.

The server address component 615 may identify a web resource. In some cases, identifying the web resource includes: computing an address of the web resource based on the service discovery indicator. In some cases, the address includes at least one of an IP address, a FQDN, or a URI of the web resource. In some cases, identifying the web resource includes: computing an address of the web resource based on an identifier of the first AP included in the broadcast message.

The service capability server identifier 620 may identify, based on the broadcast message, a web resource associated with a capability configuration of the first AP, and identify, based on the service discovery indicator, a web resource associated with a capability configuration of the first AP.

The OOB capability configuration manager 625 may access, via a second AP in a second radio frequency spectrum band, the web resource to determine the capability configuration of the first AP in the first radio frequency spectrum band.

The AP switching component 630 may determine, based on the capability configuration of the first AP, to switch from the second AP to the first AP for wireless communications in the first radio frequency spectrum band.

Figure 7:
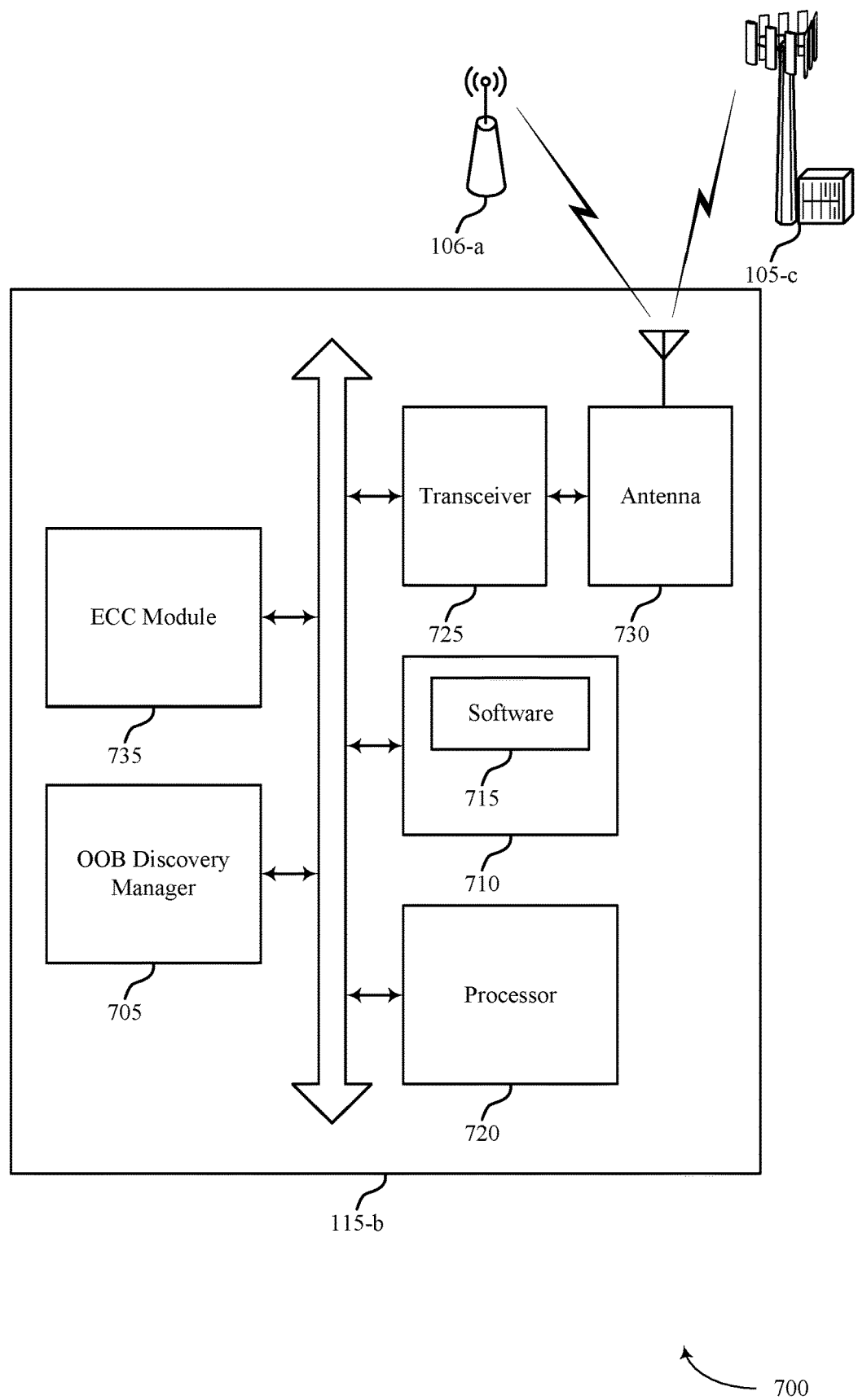
FIG. 7 illustrates a block diagram of a system including a user equipment that supports out-of-band service discovery indication in accordance with aspects of the present disclosure.

FIG. 7 shows a diagram of a system 700 including a device that supports out-of-band service discovery indication in accordance with various aspects of the present disclosure. For example, system 700 may include UE 115-b, which may be an example of a wireless device 400, a wireless device 500, or a UE 115 as described with reference to FIGS. 1 through 6.

UE 115-b may also include OOB discovery manager 705, memory 710, processor 720, transceiver 725, antenna 730 and additional module 735. Each of these modules may communicate, directly or indirectly, with one another (e.g., via one or more buses). The OOB discovery manager 705 may be an example of a OOB discovery manager as described with reference to FIGS. 4 through 6.

The memory 710 may include random access memory (RAM) and read only memory (ROM). The memory 710 may store computer-readable, computer-executable software including instructions that, when executed, cause the processor to perform various functions described herein (e.g., out-of-band service discovery indication, etc.). In some cases, the software 715 may not be directly executable by the processor but may cause a computer (e.g., when compiled and executed) to perform functions described herein. The processor 720 may include an intelligent hardware device, (e.g., a central processing unit (CPU), a microcontroller, an application specific integrated circuit (ASIC), etc.)

The transceiver 725 may communicate bi-directionally, via one or more antennas, wired, or wireless links, with one or more networks, as described above. For example, the transceiver 725 may communicate bi-directionally with a base station 105-c and/or an AP 106-a. The transceiver 725 may also include a modem to modulate the packets and provide the modulated packets to the antennas for transmission, and to demodulate packets received from the antennas.

In some cases, UE 115-b may include a single antenna 730. However, in some cases the device may have more than one antenna 730, which may be capable of concurrently transmitting or receiving multiple wireless transmissions.

The ECC module 735 may support operations on ECCs such as operation in shared or unlicensed spectrum as described above with reference to FIG. 1.

Figure 8:
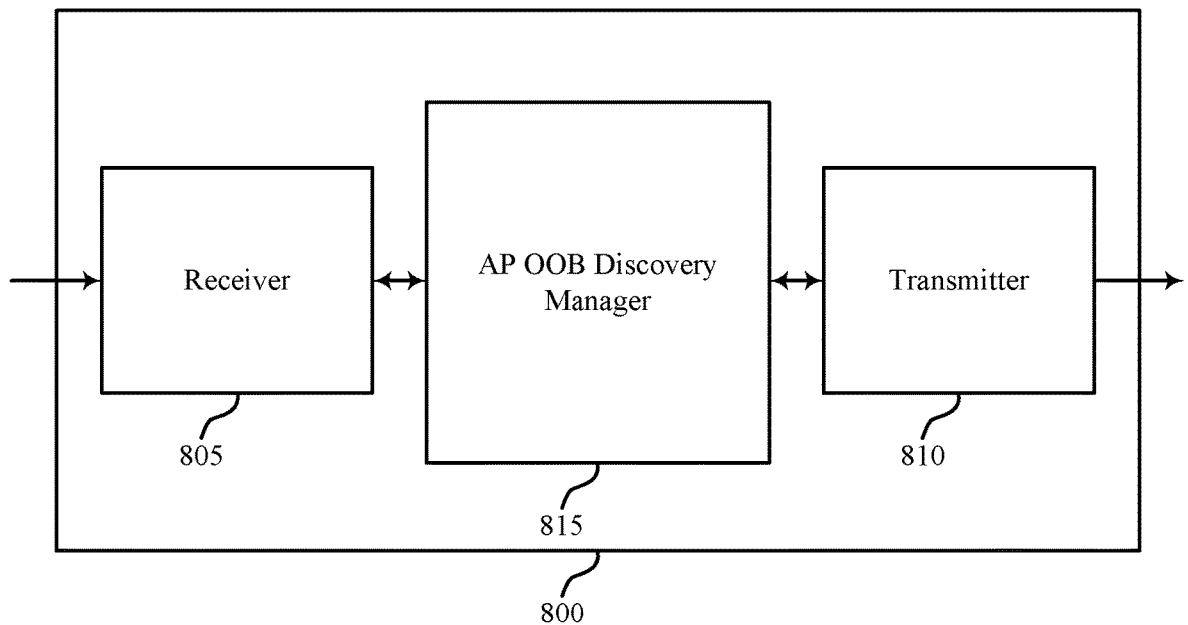
FIGS. 8 through 10 show block diagrams of a wireless device that supports out-of-band service discovery indication in accordance with aspects of the present disclosure.

FIG. 8 shows a block diagram of a wireless device 800 that supports out-of-band service discovery indication in accordance with various aspects of the present disclosure. Wireless device 800 may be an example of aspects of an AP 106 described with reference to FIGS. 1 through 3. Wireless device 800 may be an example of a base station 105 described with reference to FIGS. 1 through 3. Wireless device 800 may include receiver 805, transmitter 810 and AP OOB discovery manager 815. Wireless device 800 may also include a processor. Each of these components may be in communication with each other.

The receiver 805 may receive information such as packets, user data, or control information associated with various information channels (e.g., control channels, data channels, and information related to out-of-band service discovery indication, etc.). Information may be passed on to other components of the device. The receiver 805 may be an example of aspects of the transceiver 1125 described with reference to FIG. 11.

The transmitter 810 may transmit signals received from other components of wireless device 800. In some examples, the transmitter 810 may be collocated with a receiver in a transceiver module. For example, the transmitter 810 may be an example of aspects of the transceiver 1125 described with reference to FIG. 11. The transmitter 810 may include a single antenna, or it may include a plurality of antennas.

The AP OOB discovery manager 815 may broadcast, via a first AP in a first radio frequency spectrum band, a broadcast message including a service discovery indicator, the service discovery indicator providing an indication that the first AP supports out-of-band service capability discovery via a web resource, and establish communications with a wireless device based on the broadcast message. The AP OOB discovery manager 815 may also be an example of aspects of the AP OOB discovery manager 1105 described with reference to FIG. 11.

Figure 9:
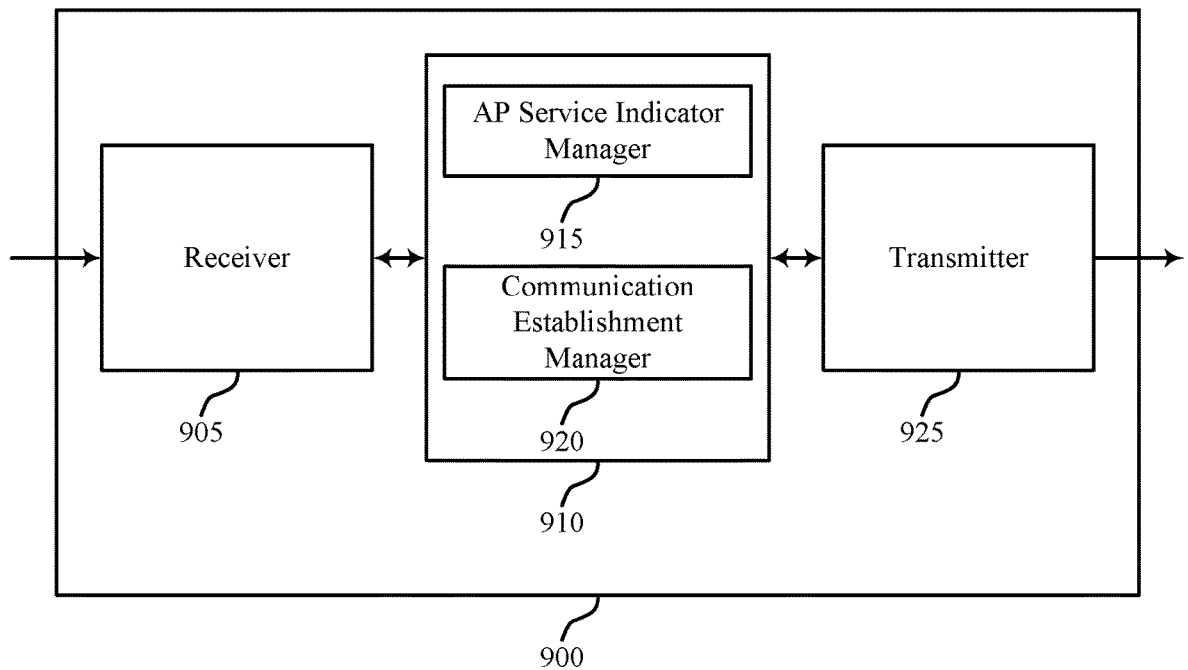

FIG. 9 shows a block diagram of a wireless device 900 that supports out-of-band service discovery indication in accordance with various aspects of the present disclosure. Wireless device 900 may be an example of aspects of a wireless device 800, a base station 105, or an AP 106 described with reference to FIGS. 1 through 3 and 8. Wireless device 900 may include receiver 905, AP OOB discovery manager 910 and transmitter 925. Wireless device 900 may also include a processor. Each of these components may be in communication with each other.

The receiver 905 may receive information which may be passed on to other components of the device. The receiver 905 may also perform the functions described with reference to the receiver 805 of FIG. 8. The receiver 905 may be an example of aspects of the transceiver 1125 described with reference to FIG. 11.

The AP OOB discovery manager 910 may be an example of aspects of AP OOB discovery manager 810 described with reference to FIG. 8. The AP OOB discovery manager 910 may include AP service indicator manager 915 and communication establishment manager 920. The AP OOB discovery manager 910 may be an example of aspects of the AP OOB discovery manager 1105 described with reference to FIG. 11.

The AP service indicator manager 915 may broadcast in a first radio frequency spectrum band, a broadcast message including a service discovery indicator, the service discovery indicator providing an indication that the first AP supports out-of-band service capability discovery via a web resource. In some cases, the broadcast message includes an information block conveying the service discovery indicator. In some cases, the information block includes at least one of a MIB or a SIB. In some cases, the service discovery indicator includes an address of the web resource. The communication establishment manager 920 may establish communications with a wireless device based on the broadcast message.

The transmitter 925 may transmit signals received from other components of wireless device 900. In some examples, the transmitter 925 may be collocated with a receiver in a transceiver module. For example, the transmitter 925 may be an example of aspects of the transceiver 1125 described with reference to FIG. 11. The transmitter 925 may utilize a single antenna, or it may utilize a plurality of antennas.

Figure 10:
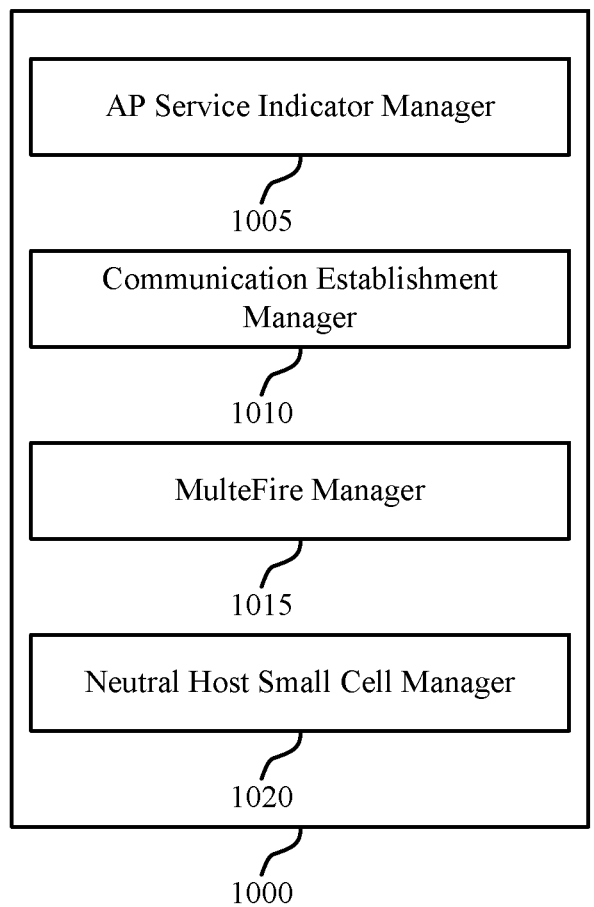

FIG. 10 shows a block diagram of an AP OOB discovery manager 1000 which may be an example of the corresponding component of wireless device 800 or wireless device 900. That is, AP OOB discovery manager 1000 may be an example of aspects of AP OOB discovery manager 815 or AP OOB discovery manager 910 described with reference to FIGS. 8 and 9. The AP OOB discovery manager 1000 may also be an example of aspects of the AP OOB discovery manager 1105 described with reference to FIG. 11.

The AP OOB discovery manager 1000 may include AP service indicator manager 1005, communication establishment manager 1010, MulteFire manager 1015 and neutral host small cell manager 1020. Each of these modules may communicate, directly or indirectly, with one another (e.g., via one or more buses).

The AP service indicator manager 1005 may broadcast in a first radio frequency spectrum band, a broadcast message including a service discovery indicator, the service discovery indicator providing an indication that the first AP supports out-of-band service capability discovery via a web resource. In some cases, the broadcast message includes an information block conveying the service discovery indicator. In some cases, the information block includes at least one of a MIB or a SIB. In some cases, the service discovery indicator includes an address of the web resource. The communication establishment manager 1010 may establish communications with a wireless device based on the broadcast message.

The AP OOB discovery manager 1000 may include a MulteFire manager 1015. MulteFire manager 1015 may support operations in an unlicensed radio frequency spectrum band associated with a MulteFire wireless network.

The AP OOB discovery manager 1000 may be a neutral host small cell manager 1020. Neutral host small cell manager 1020 may support operations within a neutral host small cell wireless network.

Figure 11:
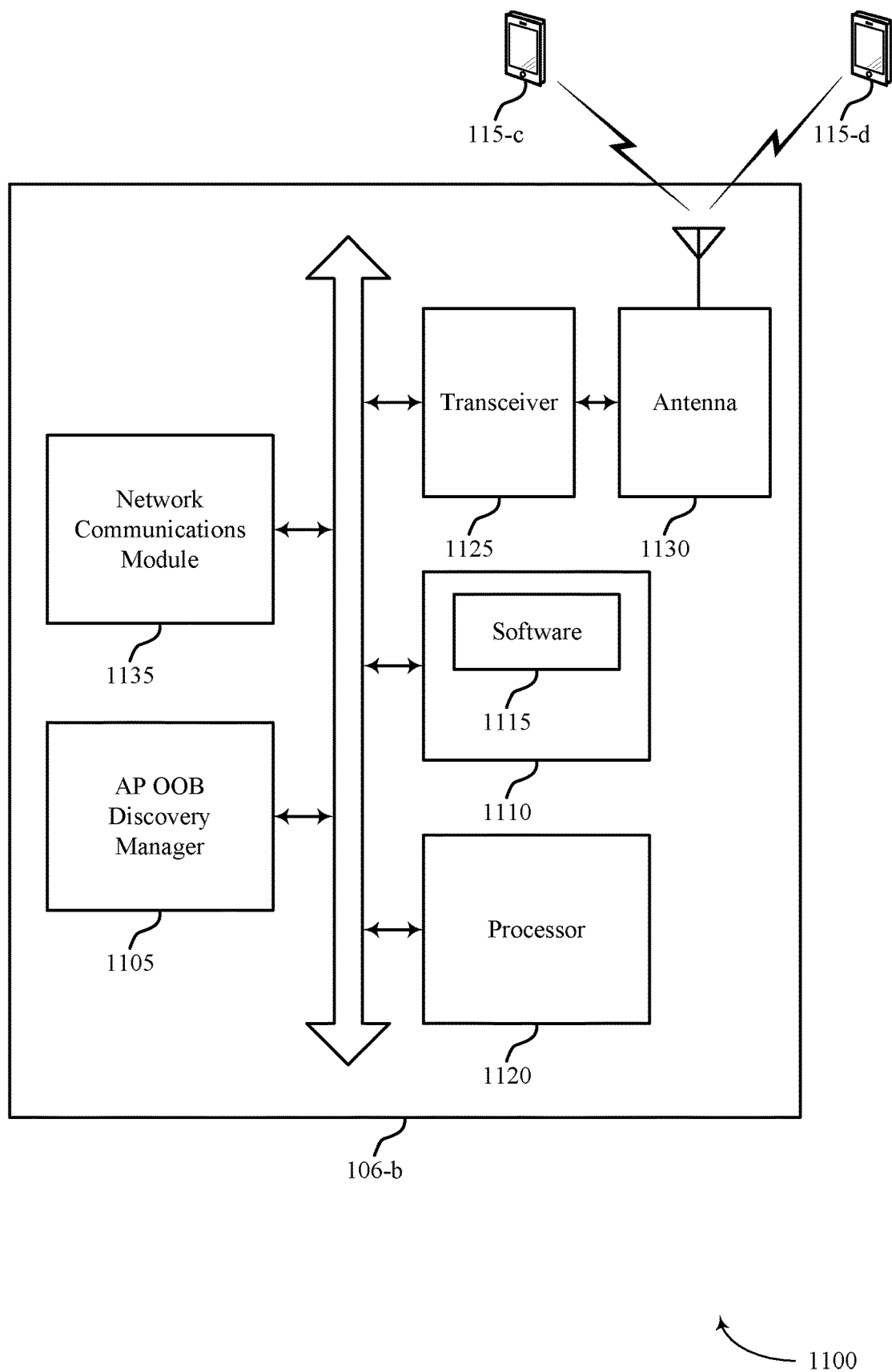
FIG. 11 illustrates a block diagram of a system including an access point that supports out-of-band service discovery indication in accordance with aspects of the present disclosure.

FIG. 11 shows a diagram of a wireless system 1100 including a device configured that supports out-of-band service discovery indication in accordance with various aspects of the present disclosure. For example, system 1100 may include AP 106-b, which may be an example of a wireless device 800, a wireless device 900, a base station 105, or an AP 106 as described with reference to FIGS. 1, 3, 8, and 10. AP 106-b may also include components for bi-directional voice and data communications including components for transmitting communications and components for receiving communications. For example, AP 106-b may communicate bi-directionally with UEs 115.

AP 106-b may also include AP OOB discovery manager 1105, memory 1110, processor 1120, transceiver 1125, antenna 1130, and network communications module 1135. Each of these modules may communicate, directly or indirectly, with one another (e.g., via one or more buses). The AP OOB discovery manager 1105 may be an example of an AP OOB discovery manager as described with reference to FIGS. 8 through 10.

The memory 1110 may include RAM and ROM. The memory 1110 may store computer-readable, computer-executable software including instructions that, when executed, cause the processor to perform various functions described herein (e.g., out-of-band service discovery indication, etc.). In some cases, the software 1115 may not be directly executable by the processor but may cause a computer (e.g., when compiled and executed) to perform functions described herein. The processor 1120 may include an intelligent hardware device, (e.g., a CPU, a microcontroller, an ASIC, etc.)

The transceiver 1125 may communicate bi-directionally, via one or more antennas, wired, or wireless links, with one or more networks, as described above. For example, the transceiver 1125 may communicate bi-directionally with a base station 105 or a UEs 115-c and 115-d. The transceiver 1125 may also include a modem to modulate the packets and provide the modulated packets to the antennas for transmission, and to demodulate packets received from the antennas.

In some cases, the wireless device may include a single antenna 1130. However, in some cases the device may have more than one antenna 730, which may be capable of concurrently transmitting or receiving multiple wireless transmissions.

The network communications module 1135 may manage communications with the WLAN, WWAN, or MulteFire network (e.g., wirelessly or via one or more wired backhaul links). For example, the network communications module 1135 may manage the transfer of data communications for client devices, such as one or more UEs 115.

Figure 12:
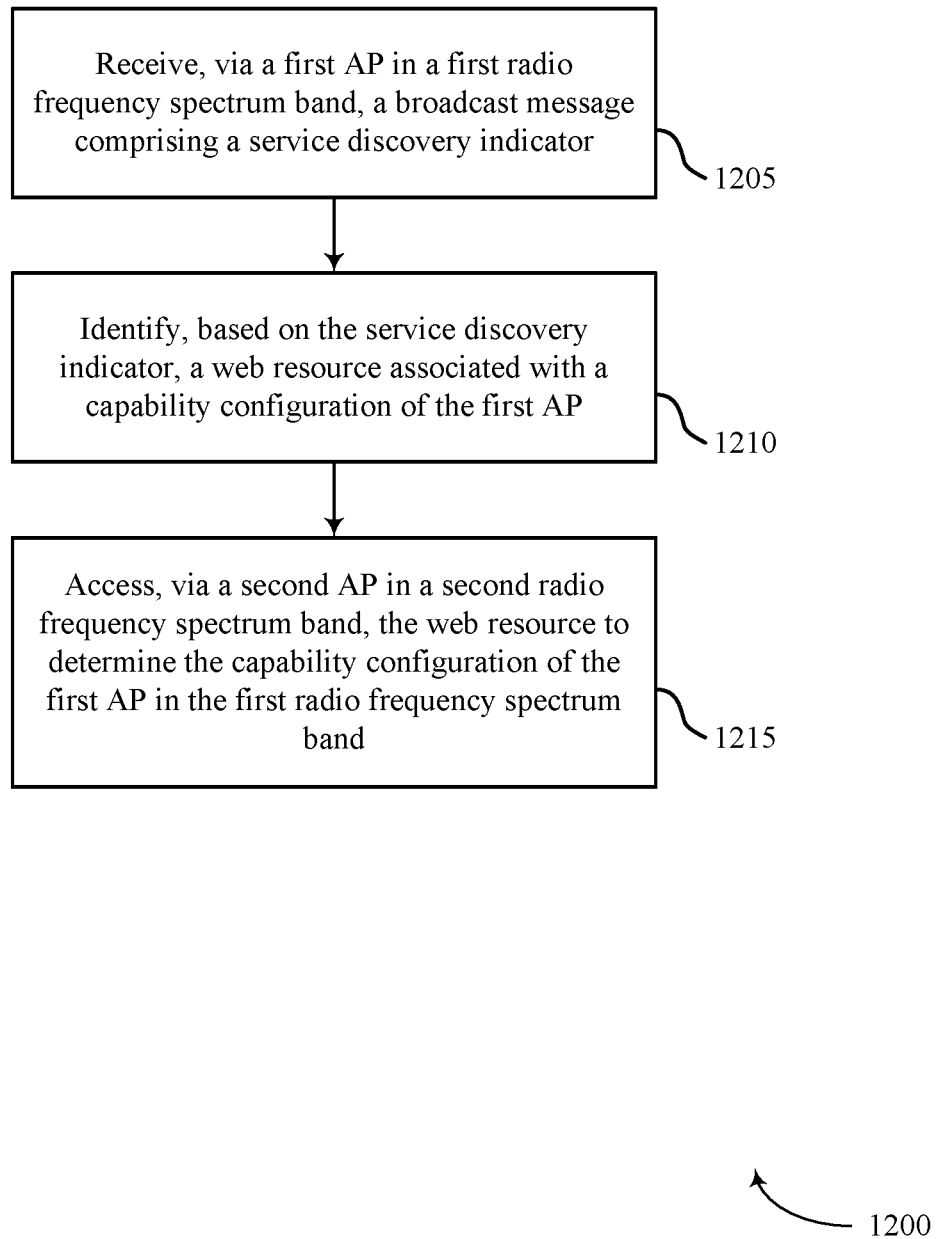
FIGS. 12 through 16 illustrate methods for out-of-band service discovery indication in accordance with aspects of the present disclosure.

FIG. 12 shows a flowchart illustrating a method 1200 for out-of-band service discovery indication in accordance with various aspects of the present disclosure. The operations of method 1200 may be implemented by a device such as a UE 115 or its components as described with reference to FIGS. 1 through 3. For example, the operations of method 1200 may be performed by the OOB discovery manager as described herein. In some examples, the UE 115 may execute a set of codes to control the functional elements of the device to perform the functions described below. Additionally or alternatively, the UE 115 may perform aspects the functions described below using special-purpose hardware.

At block 1205, the UE 115 may receive, via a first AP in a first radio frequency spectrum band, a broadcast message including a service discovery indicator as described above with reference to FIGS. 2 through 3. In certain examples, the operations of block 1205 may be performed by the service discovery indicator manager as described with reference to FIGS. 5 and 6.

At block 1210, the UE 115 may identify, based on the service discovery indicator, a web resource associated with a capability configuration of the first AP as described above with reference to FIGS. 2 through 3. In certain examples, the operations of block 1210 may be performed by the service capability server identifier as described with reference to FIGS. 5 and 6.

At block 1215, the UE 115 may access, via a second AP in a second radio frequency spectrum band, the web resource to determine the capability configuration of the first AP in the first radio frequency spectrum band as described above with reference to FIGS. 2 through 3. In certain examples, the operations of block 1215 may be performed by the OOB capability configuration manager as described with reference to FIGS. 5 and 6.

Figure 13:
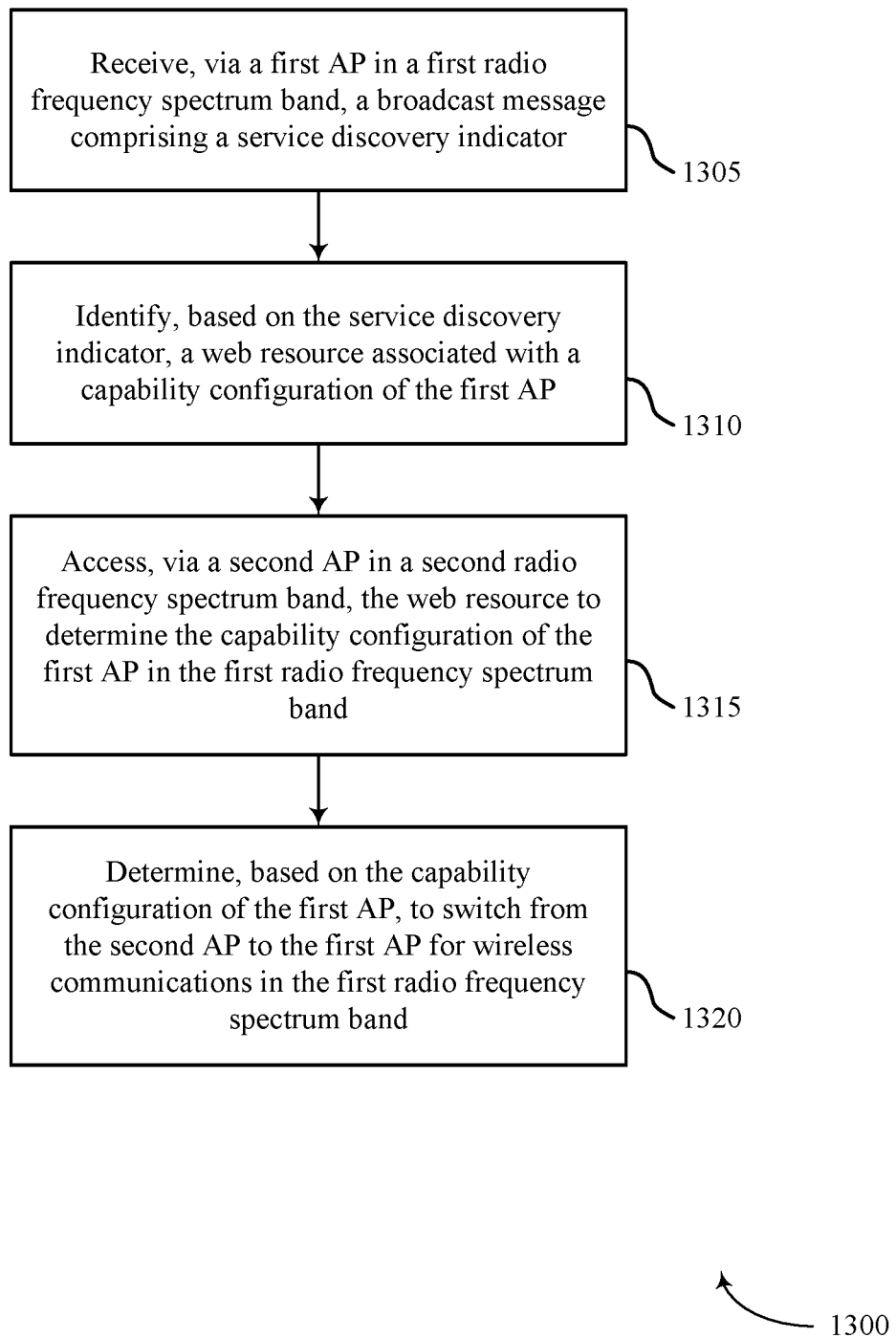

FIG. 13 shows a flowchart illustrating a method 1300 for out-of-band service discovery indication in accordance with various aspects of the present disclosure. The operations of method 1300 may be implemented by a device such as a UE 115 or its components as described with reference to FIGS. 1 through 3. For example, the operations of method 1300 may be performed by the OOB discovery manager as described herein. In some examples, the UE 115 may execute a set of codes to control the functional elements of the device to perform the functions described below. Additionally or alternatively, the UE 115 may perform aspects the functions described below using special-purpose hardware.

At block 1305, the UE 115 may receive, via a first AP in a first radio frequency spectrum band, a broadcast message including a service discovery indicator as described above with reference to FIGS. 2 through 3. In certain examples, the operations of block 1305 may be performed by the service discovery indicator manager as described with reference to FIGS. 5 and 6.

At block 1310, the UE 115 may identify, based on the service discovery indicator, a web resource associated with a capability configuration of the first AP as described above with reference to FIGS. 2 through 3. In certain examples, the operations of block 1310 may be performed by the service capability server identifier as described with reference to FIGS. 5 and 6.

At block 1315, the UE 115 may access, via a second AP in a second radio frequency spectrum band, the web resource to determine the capability configuration of the first AP in the first radio frequency spectrum band as described above with reference to FIGS. 2 through 3. In certain examples, the operations of block 1315 may be performed by the OOB capability configuration manager as described with reference to FIGS. 5 and 6.

At block 1320, the UE 115 may determine, based on the capability configuration of the first AP, to switch from the second AP to the first AP for wireless communications in the first radio frequency spectrum band as described above with reference to FIGS. 2 through 3. In certain examples, the operations of block 1320 may be performed by the AP switching component as described with reference to FIGS. 5 and 6.

Figure 14:
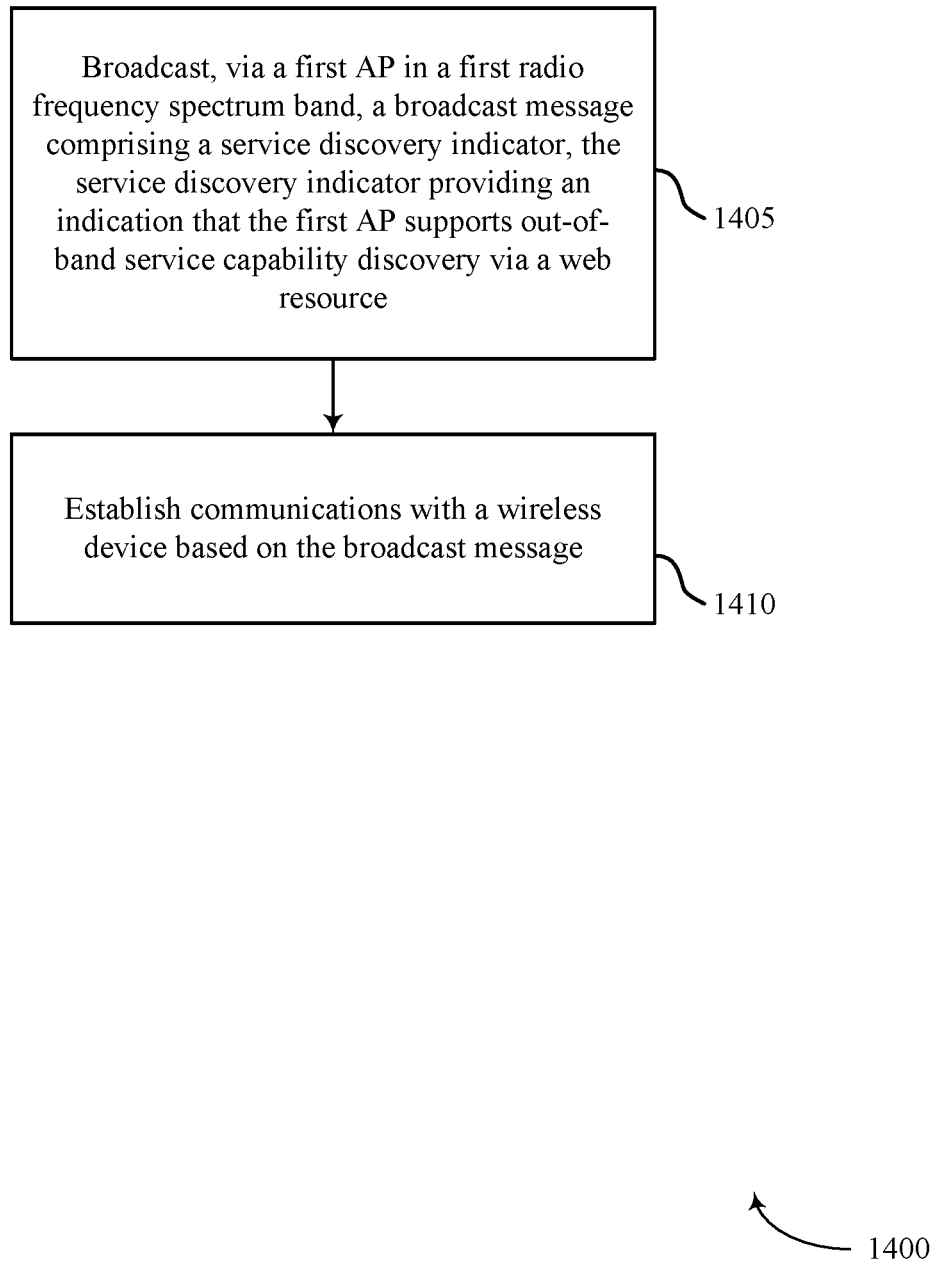

FIG. 14 shows a flowchart illustrating a method 1400 for out-of-band service discovery indication in accordance with various aspects of the present disclosure. The operations of method 1400 may be implemented by a device such as an AP 106 or its components as described with reference to FIGS. 1 through 3. For example, the operations of method 1400 may be performed by the AP OOB discovery manager as described herein. In some examples, the AP 106 may execute a set of codes to control the functional elements of the device to perform the functions described below. Additionally or alternatively, the AP 106 may perform aspects the functions described below using special-purpose hardware.

At block 1405, the AP 106 may broadcast in a first radio frequency spectrum band, a broadcast message including a service discovery indicator, the service discovery indicator providing an indication that the first AP supports out-of-band service capability discovery via a web resource as described above with reference to FIGS. 2 through 3. In certain examples, the operations of block 1405 may be performed by the AP service indicator manager as described with reference to FIGS. 9 and 10.

At block 1410, the AP 106 may establish communications with a wireless device based on the broadcast message as described above with reference to FIGS. 2 through 3. In certain examples, the operations of block 1410 may be performed by the communication establishment manager as described with reference to FIGS. 9 and 10.

Figure 15:
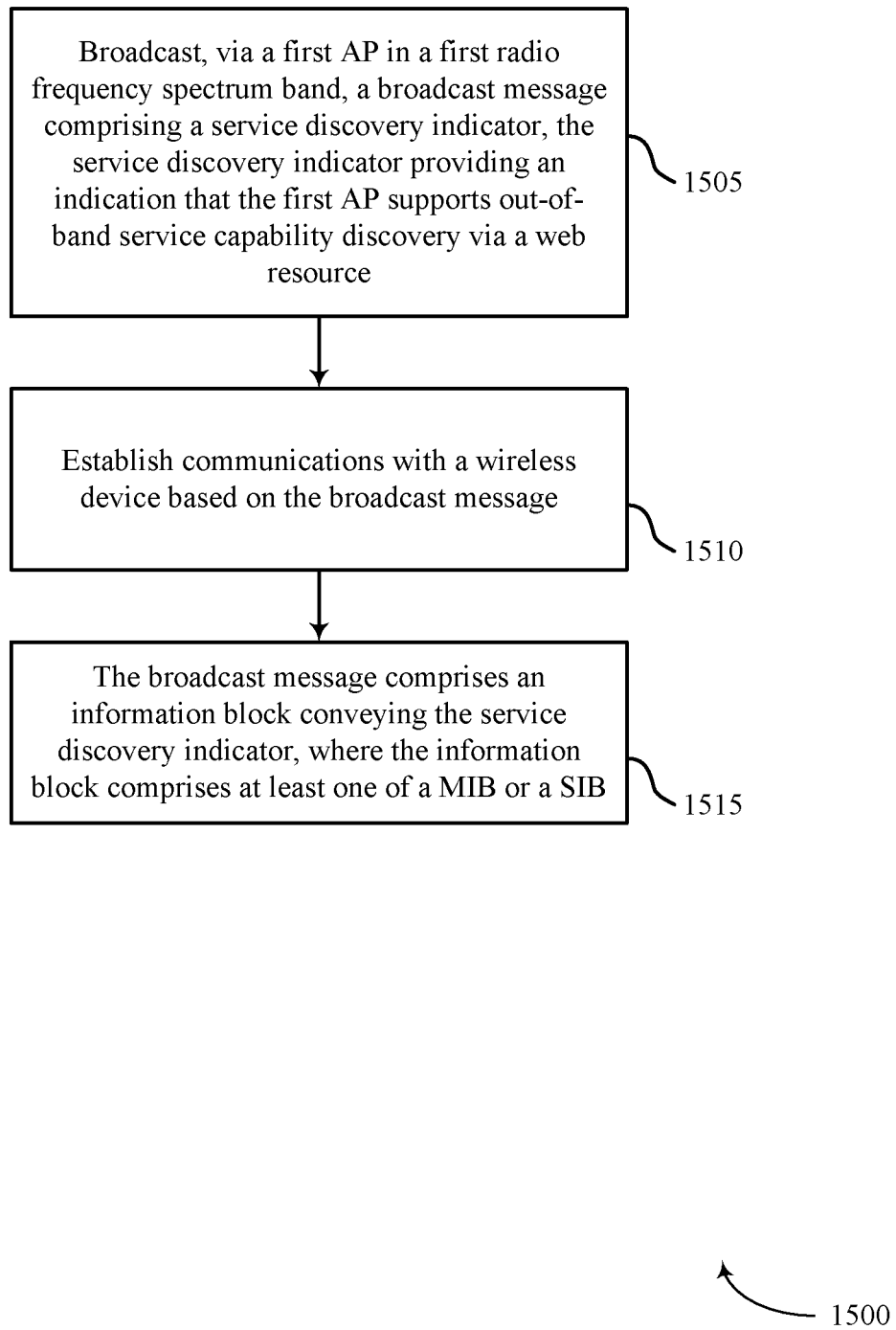

FIG. 15 shows a flowchart illustrating a method 1500 for out-of-band service discovery indication in accordance with various aspects of the present disclosure. The operations of method 1500 may be implemented by a device such as an AP 106 or its components as described with reference to FIGS. 1 and 2. For example, the operations of method 1500 may be performed by the AP OOB discovery manager as described herein. In some examples, the AP 106 may execute a set of codes to control the functional elements of the device to perform the functions described below. Additionally or alternatively, the AP 106 may perform aspects the functions described below using special-purpose hardware.

At block 1505, the AP 106 may broadcast, via a first AP in a first radio frequency spectrum band, a broadcast message including a service discovery indicator, the service discovery indicator providing an indication that the first AP supports out-of-band service capability discovery via a web resource as described above with reference to FIGS. 2 through 3. In certain examples, the operations of block 1505 may be performed by the AP service indicator manager as described with reference to FIGS. 9 and 10.

At block 1510, the AP 106 may establish communications with a wireless device based on the broadcast message as described above with reference to FIGS. 2 through 3. In certain examples, the operations of block 1510 may be performed by the communication establishment manager as described with reference to FIGS. 9 and 10.

At block 1515, the AP 106 may the broadcast message includes an information block conveying the service discovery indicator as described above with reference to FIGS. 2 through 3. In some cases, the information block includes at least one of a MIB or a SIB. In certain examples, the operations of block 1515 may be performed by the AP service indicator manager as described with reference to FIGS. 9 and 10.

At block 1520, the AP 106 may as described above with reference to FIGS. 2 through 3. In certain examples, the operations of block 1520 may be performed by the AP service indicator manager as described with reference to FIGS. 9 and 10.

Figure 16:
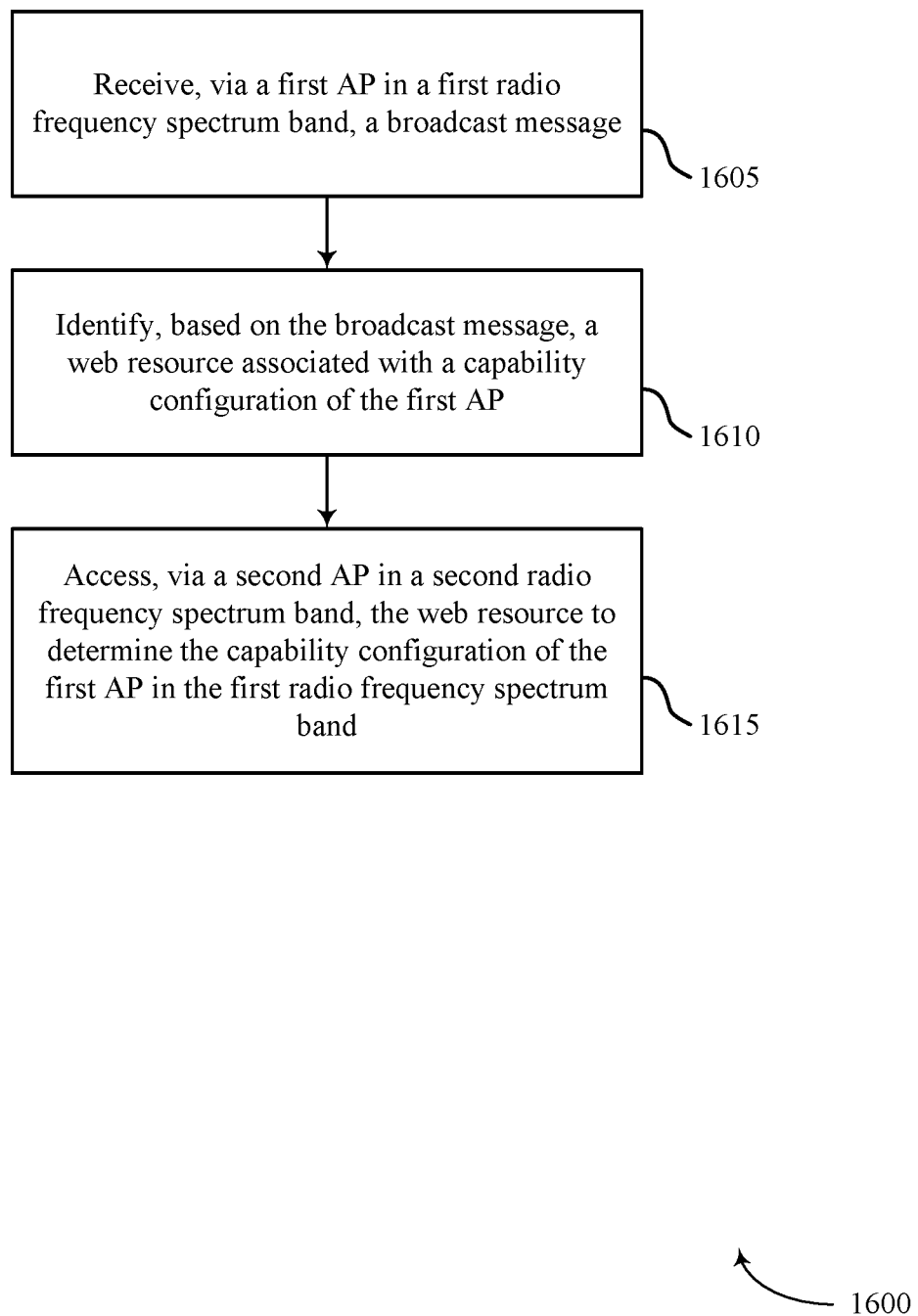

FIG. 16 shows a flowchart illustrating a method 1600 for out-of-band service discovery indication in accordance with various aspects of the present disclosure. The operations of method 1600 may be implemented by a device such as a UE 115 or its components as described with reference to FIGS. 1 through 3. For example, the operations of method 1600 may be performed by the OOB discovery manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may receive, via a first AP in a first radio frequency spectrum band, a broadcast message as described above with reference to FIGS. 2 through 3. In certain examples, the operations of block 1605 may be performed by the service discovery indicator manager as described with reference to FIGS. 5 and 6.

At block 1610, the UE 115 may identify, based on the broadcast message, a web resource associated with a capability configuration of the first AP as described above with reference to FIGS. 2 through 3. In certain examples, the operations of block 1610 may be performed by the service capability server identifier as described with reference to FIGS. 5 and 6.

At block 1615, the UE 115 may access, via a second AP in a second radio frequency spectrum band, the web resource to determine the capability configuration of the first AP in the first radio frequency spectrum band as described above with reference to FIGS. 2 through 3. In certain examples, the operations of block 1615 may be performed by the OOB capability configuration manager as described with reference to FIGS. 5 and 6.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for out-of-band service discovery indication.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink (DL) transmissions described herein may also be called forward link transmissions while the uplink (UL) transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for out-of-band service discovery indication. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration). Thus, the functions described herein may be performed by one or more other processing units (or cores), on at least one IC. In various examples, different types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
    tuning away, by a single tuner of a wireless device, from a second radio frequency spectrum band to a first radio frequency spectrum band, wherein the tuning away is to detect a presence of a first access point (AP);
    receiving, via the first AP in the first radio frequency spectrum band while tuned away from the second radio frequency spectrum band, a broadcast message comprising a service discovery indicator, wherein the service discovery indicator provides an indication that the first AP supports out-of-band service capability discovery;
    identifying, based at least in part on the service discovery indicator, a web resource associated with a capability configuration of the first AP; and
    accessing, via a second AP in the second radio frequency spectrum band, the web resource to determine the capability configuration of the first AP in the first radio frequency spectrum band.

2. The method of claim 1, further comprising:
    determining, based on the capability configuration of the first AP, to switch from the second AP to the first AP for wireless communications in the first radio frequency spectrum band.

3. The method of claim 1, wherein receiving the broadcast message comprises:
    decoding an information block broadcast by the first AP in the first radio frequency spectrum band.

4. The method of claim 3, wherein the information block comprises at least one of a master information block (MIB) or a system information block (SIB).

5. The method of claim 1, wherein identifying the web resource comprises:
    computing an address of the web resource based at least in part on the service discovery indicator.

6. The method of claim 5, wherein the address comprises at least one of an internet protocol (IP) address, a fully qualified domain name (FQDN), or a uniform resource identifier (URI) of the web resource.

7. The method of claim 1, wherein the first radio frequency spectrum band is an unlicensed radio frequency spectrum band associated with a MulteFire wireless network.

8. The method of claim 1, wherein the first radio frequency spectrum band is associated with a neutral host small cell wireless network.

9. The method of claim 1, wherein the service discovery indicator comprises an address of the web resource.

10. A method of wireless communication comprising:
    tuning away, by a single tuner of a wireless device, from a second radio frequency spectrum band to a first radio frequency spectrum band, wherein the tuning away is to detect a presence of a first access point (AP);
    receiving, via the first access point (AP) in the first radio frequency spectrum band while tuned away from the second radio frequency spectrum band, a broadcast message;
    identifying, based at least in part on the broadcast message, a web resource associated with a capability configuration of the first AP; and
    accessing, via a second AP in the second radio frequency spectrum band, the web resource to determine the capability configuration of the first AP in the first radio frequency spectrum band.

11. The method of claim 10, further comprising:
    determining, based on the capability configuration of the first AP, to switch from the second AP to the first AP for wireless communications in the first radio frequency spectrum band.

12. The method of claim 10, wherein receiving the broadcast message comprises:
    decoding an information block broadcast by the first AP in the first radio frequency spectrum band.

13. The method of claim 12, wherein the information block comprises at least one of a master information block (MIB) or a system information block (SIB).

14. The method of claim 10, wherein identifying the web resource comprises:
    computing an address of the web resource based at least in part on an identifier of the first AP included in the broadcast message.

15. An apparatus for wireless communication comprising:
    a processor;
    memory in electronic communication with the processor; and
    instructions stored in the memory and operable, when executed by the processor, to cause the apparatus to:
        tune away, by a single tuner of the apparatus, from a second radio frequency spectrum band to a first radio frequency spectrum band, wherein the tuning away is to detect a presence of a first access point (AP);
        receive, via the first AP in the first radio frequency spectrum band while tuned away from the second radio frequency spectrum band, a broadcast message comprising a service discovery indicator, wherein the service discovery indicator provides an indication that the first AP supports out-of-band service capability discovery;
        identify, based at least in part on the service discovery indicator, a web resource associated with a capability configuration of the first AP; and
        access, via a second AP in the second radio frequency spectrum band, the web resource to determine the capability configuration of the first AP in the first radio frequency spectrum band.

16. The apparatus of claim 15, wherein the instructions are operable to cause the processor to:
    determine, based on the capability configuration of the first AP, to switch from the second AP to the first AP for wireless communications in the first radio frequency spectrum band.

17. The apparatus of claim 15, wherein the instructions to cause the apparatus to receive the broadcast message comprise instructions to cause the apparatus to:
    decode an information block broadcast by the first AP in the first radio frequency spectrum band.

18. The apparatus of claim 17, wherein the information block comprises at least one of a master information block (MIB) or a system information block (SIB).

19. The apparatus of claim 15, wherein the instructions to cause the apparatus to identify the web resource comprise instructions to cause the apparatus to:

compute an address of the web resource based at least in part on the service discovery indicator.

20. The apparatus of claim 19, wherein the address comprises at least one of an internet protocol (IP) address, a fully qualified domain name (FQDN), or a uniform resource identifier (URI) of the web resource.

21. The apparatus of claim 15, wherein the first radio frequency spectrum band is an unlicensed radio frequency spectrum band associated with a MulteFire wireless network.

22. The apparatus of claim 15, wherein the first radio frequency spectrum band is associated with a neutral host small cell wireless network.

\* \* \* \* \*